United States Patent
Chang et al.

(10) Patent No.: US 12,094,172 B2
(45) Date of Patent: Sep. 17, 2024

(54) CAMERA CALIBRATION METHOD AND CAMERA CALIBRATION SYSTEM

(71) Applicant: Industrial Technology Research Institute, Hsinchu (TW)

(72) Inventors: Shu-Hsin Chang, Hsinchu County (TW); Kun-Hsien Lu, Kaohsiung (TW); Yi-Yu Su, Kaohsiung (TW); Wei-Cheng Sun, Kaohsiung (TW); Yu-Hsien Hsiao, Chiayi County (TW)

(73) Assignee: Industrial Technology Research Institute, Hsinchu (TW)

( * ) Notice: Subject to any disclaimer, the term of this patent is extended or adjusted under 35 U.S.C. 154(b) by 105 days.

(21) Appl. No.: 18/086,689

(22) Filed: Dec. 22, 2022

(65) Prior Publication Data

US 2024/0221217 A1 Jul. 4, 2024

(51) Int. Cl.
*G06T 7/80* (2017.01)

(52) U.S. Cl.
CPC ................................. *G06T 7/80* (2017.01)

(58) Field of Classification Search
CPC .... G06T 7/80; G06T 7/13; G06T 7/70; G06T 7/73; G06T 7/74
See application file for complete search history.

(56) References Cited

U.S. PATENT DOCUMENTS

| | | | |
|---|---|---|---|
| 7,356,425 B2 | 4/2008 | Krahnstoever et al. | |
| 8,872,925 B2 | 10/2014 | Xie et al. | |
| 9,286,678 B2 * | 3/2016 | Zhu | G06T 7/80 |
| 9,749,594 B2 | 8/2017 | Huang et al. | |
| 9,875,542 B2 | 1/2018 | Ikeda | |
| 10,230,946 B2 * | 3/2019 | Baba | G06T 7/80 |
| 10,269,141 B1 | 4/2019 | Shotan | |
| 10,803,624 B2 | 10/2020 | Ziegler et al. | |
| 11,132,789 B2 * | 9/2021 | Ohshima | G06T 7/60 |

(Continued)

FOREIGN PATENT DOCUMENTS

| | | |
|---|---|---|
| CN | 102356633 | 2/2012 |
| TW | 202014851 | 4/2020 |
| TW | I720447 | 3/2021 |

OTHER PUBLICATIONS

"Office Action of Taiwan Counterpart Application", issued on Dec. 29, 2023, p. 1-p. 9.

(Continued)

*Primary Examiner* — Chiawei Chen
(74) *Attorney, Agent, or Firm* — JCIPRNET

(57) ABSTRACT

The present disclosure provides a camera calibration method and a system thereof. The method includes setting up a camera in a space; establishing or selecting two line segments in the space, and obtaining an image of the space including the two line segments, and obtaining heights and image coordinates of upper and lower endpoints of the two line segments; calculating a focal length, a first rotation angle, a second rotation angle and a third element of a translation vector of the camera based on the information of the two line segments; calculating a third rotation angle of the camera based on a reference direction and the camera information obtained above; calculating a first element and a second element of the translation vector of the camera based on a reference point and the camera information obtained above.

20 Claims, 16 Drawing Sheets

(56) References Cited

U.S. PATENT DOCUMENTS

| | | | |
|---|---|---|---|
| 11,748,906 B2* | 9/2023 | Lu | H04N 23/698 345/419 |
| 2015/0029345 A1 | 1/2015 | Ikeda | |
| 2015/0279035 A1 | 10/2015 | Wolski et al. | |
| 2016/0350921 A1 | 12/2016 | Bataller et al. | |
| 2018/0300900 A1 | 10/2018 | Wakai et al. | |
| 2019/0158813 A1* | 5/2019 | Rowell | H04N 13/111 |
| 2022/0108473 A1* | 4/2022 | Corona | G08G 1/164 |
| 2023/0377102 A1* | 11/2023 | Kawano | G06T 7/80 |

OTHER PUBLICATIONS

Radu Orghidan et al., "Camera Calibration using two or three vanishing points", 2012 Proceedings of the Federated Conference on Computer Science and Information Systems (FedCSIS), Sep. 2012, pp. 123-130.

En Peng et al., "Camera calibration using one-dimensional information and its applications in both controlled and uncontrolled environments", Pattern Recognition, vol. 43, Mar. 2010, pp. 1188-1198.

Gaku Nakano, "Camera Calibration Using Parallel Line Segments", 2020 25th International Conference on Pattern Recognition (ICPR), Jan. 2021, pp. 1505-1512.

Zhengyou Zhang, "A Flexible New Technique for Camera Calibration", IEEE Transactions on Pattern Analysis and Machine Intelligence, vol. 22, Nov. 2000, pp. 1330-1334.

Zhengyou Zhang, "Camera Calibration with One-Dimensional Objects", IEEE Transactions on Pattern Analysis and Machine Intelligence, vol. 26, Jul. 2004, pp. 892-899.

Jen-Hui Chuang et al., "Geometry-Based Camera Calibration Using Closed-Form Solution of Principal Line", IEEE Transactions on Image Processing, vol. 30, Jan. 2021, pp. 2599-2610.

Jinglei Wang et al., "A New Camera Calibration Method Based on Two Vertical Lines", The 10th International Conference on Communications, Circuits and Systems (ICCCAS), Dec. 2018, pp. 399-402.

* cited by examiner $L_B(u,v) = u + a_B v + b_B = 0$ $L_A(u,v) = u + a_A v + b_A = 0$ $\left( \dfrac{a_A b_B - a_B b_A}{a_B - a_A}, \dfrac{b_A - b_B}{a_B - a_A} \right)$ $p_C$

FIG. 7

CAMERA CALIBRATION METHOD AND CAMERA CALIBRATION SYSTEM

TECHNICAL FIELD

The disclosure relates to a camera calibration method and a camera calibration system.

BACKGROUND

With the advancement of technology, the function of cameras configured to obtain images is no longer limited to preservation of the images, and can further transform the image coordinates of objects on the camera into world coordinates, and then detect, track and position objects to apply to the field of computer vision, such as intelligent video surveillance, robot vision and vehicle vision.

In order to accurately transform the coordinates of objects between the world coordinate system and the image coordinate system, camera calibration has become an important issue in the field of computer vision. Camera calibration is used to obtain intrinsic parameters and extrinsic parameters of the camera.

Common camera calibration methods, such as the vanishing points method, use the parallel lines of the XYZ axis in the three-dimensional space as the calibration pattern, so the application field is limited to buildings with a square appearance. In addition, for example, the chessboard calibration method uses a two-dimensional chessboard as a calibration tool, and the input parameters include the world coordinates and image coordinates of each intersection of the chessboard. And, for example, the direct linear transform (DLT) calibration method requires the world coordinates and image coordinates of at least six reference points. Both of the above two methods need to capture the world coordinates of multiple reference points. Therefore, space measurement forms the prime cost for the construction of applications related to camera calibration and image positioning.

Other camera calibration methods use a numerical solution rather than a precise analytical solution to provide intrinsic and extrinsic parameters of the camera. These methods, for example, use multiple vertical objects or one-dimensional objects located on a horizontal plane as calibration pattern. However, the calculation of camera parameters using numerical methods often converges to wrong results due to improper initial value settings. Based on this, how to strike a balance between the construction cost, precision and applicability for diverse field is a subject that those skilled in the art are working on.

SUMMARY

The disclosure provides a camera calibration method and a camera calibration system, which can perform camera calibration through two vertical line segments in space to obtain intrinsic and extrinsic parameters of the camera.

The disclosure provides a camera calibration method, which includes: setting up a camera in a space; selecting or establishing a first vertical line segment and a second vertical line segment in the space, wherein the first vertical line segment includes a first endpoint and a second endpoint, and the second vertical line segment includes a third endpoint and a fourth endpoint; capturing an image containing the first vertical line segment and the second vertical line segment in the space by the camera; obtaining a first endpoint height of the first endpoint, a second endpoint height of the second endpoint, a third endpoint height of the third endpoint and a fourth endpoint height of the fourth endpoint; obtaining a first endpoint image coordinates corresponding to the first endpoint and a second endpoint image coordinates corresponding to the second endpoint in the image; obtaining a third endpoint image coordinates corresponding to the third endpoint and a fourth endpoint image coordinates corresponding to the fourth endpoint in the image; based on the first endpoint image coordinates and the first endpoint height, the second endpoint image coordinates and the second endpoint height, the third endpoint image coordinates and the third endpoint height, and the fourth endpoint image coordinates and the fourth endpoint height, calculating a focal length, a first rotation angle, a second rotation angle and a third translation vector element of a translation vector of the camera; calculating a third rotation angle of the camera based on a reference direction of the space, the focal length, the first rotation angle and the second rotation angle of the camera; calculating a first translation vector element and a second translation vector element of the translation vector of the camera based on a reference point of the space, the focal length, the first rotation angle, the second rotation angle, the third rotation angle, and the third translation vector element of the translation vector of the camera.

The present disclosure provides a camera calibration system. The camera calibration system has a camera, a storage unit and a processing unit. The camera is used to capture an image of a space, wherein a first vertical line segment and a second vertical line segment are established in the space, wherein the first vertical line segment includes a first endpoint and a second endpoint, and the second vertical line segment includes a third endpoint and a fourth endpoint. The storage unit is used to store a first endpoint height of the first endpoint, a second endpoint height of the second endpoint, a third endpoint height of the third endpoint, a fourth endpoint height of the fourth endpoint, a first endpoint image coordinates corresponding to the first endpoint in the image, a second endpoint image coordinates corresponding to the second endpoint in the image, a third endpoint image coordinates corresponding to the third endpoint in the image and a fourth endpoint image coordinates corresponding to the fourth endpoint in the image. The processing unit is connected to the camera and the storage unit, and is used to calculate a focal length, a first rotation angle, a second rotation angle and a third translation vector element of a translation vector of the camera based on the first endpoint image coordinates and the first endpoint height, the second endpoint image coordinates and the second endpoint height, the third endpoint image coordinates and the third endpoint height, and the fourth endpoint image coordinates and the fourth endpoint height. In addition, the processing unit is further used to calculate a third rotation angle of the camera based on a reference direction of the space, the focal length, the first rotation angle, and the second rotation angle of the camera. The processing unit is also used to calculate a first translation vector element and a second translation vector element of the translation vector based on a reference point of the space, the focal length, the first rotation angle, the second rotation angle, the third rotation angle and the third translation vector element of the translation vector of the camera.

Based on the above, the camera calibration method and camera calibration system disclosed in this disclosure can calibrate the camera through two vertical line segments at different positions, a reference direction, and a reference point, and then the obtained intrinsic and extrinsic parameters of the camera can be used in the calculation of coordinate transformation between the image coordinate system and the world coordinate system.

Several exemplary embodiments accompanied with figures are described in detail below to further describe the disclosure in details.

BRIEF DESCRIPTION OF THE DRAWINGS

FIG. 7 is a schematic diagram illustrating calculation of an intersection according to an exemplary embodiment of the present disclosure.

DETAILED DESCRIPTION OF DISCLOSURED EMBODIMENTS

Figure 1:
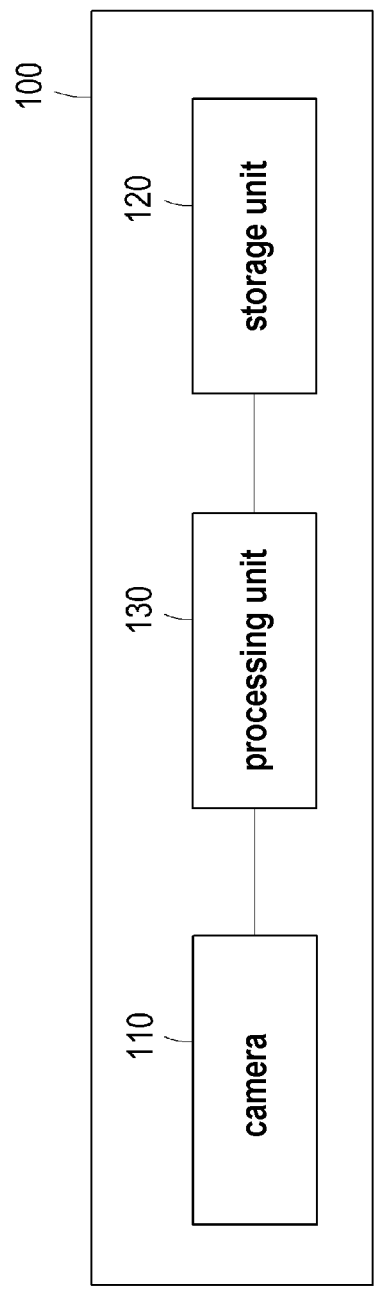
FIG. 1 is a block diagram of a camera calibration system according to an exemplary embodiment of the present disclosure.

In the description of the following embodiments, the world coordinate system and the camera coordinate system are both three-dimensional coordinate systems. The three-dimensional coordinate system is composed of the origin and the mutually perpendicular X axis, Y axis, and Z axis. The three-dimensional coordinate system can be divided into a left-handed coordinate system and a right-handed coordinate system based on the relative relationship between the directions of the X axis, Y axis, and Z axis. The left-handed coordinate system is that the left thumb points in the positive direction of the Z axis, and the direction in which the rest four fingers bend toward the palm is from the positive direction of the X axis to the positive direction of the Y axis. The right-hand coordinate system is that the right thumb points in the positive direction of the Z axis, and the direction in which the rest four fingers bend toward the palm bends is from the positive direction of the X axis to the positive direction of the Y axis. The world coordinate system and the camera coordinate system can both belong to the left-handed coordinate system or both belong to the right-handed coordinate system. The present disclosure is not limited thereto.

The world coordinate system is the coordinate system used to mark the spatial position of objects in the real world. The positive direction of the Z axis of this coordinate system is the upward direction from the center of the earth through the ground plane indicated as Z=0, and the XY plane is perpendicular to the Z axis. For example, the world coordinate system can be realized by using the World Geodetic System (WGS), or, in other embodiments of the present disclosure, the origin position, the X axis direction and the Y axis direction are all obtained by observing. It depends on the reference system the observer expects to use to describe the position of the object. The present disclosure is not limited thereto.

The camera coordinate system is a three-dimensional coordinate system formed with the center point of the camera lens as the origin. The camera coordinate system defines three-axis directions of the three-dimensional coordinate system in a manner corresponding to a left-handed or a right-handed coordinate system. In an exemplary embodiment of the present disclosure, the camera coordinate system takes the direction looking straight ahead by the camera lens as the positive direction of the x axis, and according to the left-handed coordinate system, the direction corresponding to the rightward direction of the camera image and perpendicular to the x axis in the space is determined to be the positive direction of the y axis of the camera coordinate system; and the direction corresponding to the upward direction of the camera image and perpendicular to the x axis is determined to be the positive direction of the z axis of the camera coordinate system, but the disclosure is not limited thereto.

The image coordinate system is the coordinate system to which the image captured by the camera belongs, that is to say, the image coordinate system is actually a two-dimensional coordinate system. The image coordinate system is composed of image origin, u axis, and v axis. In an exemplary embodiment of the present disclosure, the origin of the image coordinate system is located at the center of the image plane, the direction of the u axis is horizontal to the right, and the direction of the v axis is vertical upward, but the present disclosure is not limited thereto. The image coordinate system relates to the camera coordinate system. Specifically, when coordinates of an object transforms between the image coordinate system and the world coordinate system, it is transformed through the intermediary camera coordinate system.

FIG. 1 is a block diagram of a camera calibration system according to an exemplary embodiment of the present disclosure.

Referring to FIG. 1, the camera calibration system 100 includes: a camera 110, a storage unit 120 and a processing unit 130.

The camera 110 is used to capture an image, and the camera 110 has corresponding extrinsic parameters and intrinsic parameters. The extrinsic parameters correspond to the transformation between the world coordinates and the camera coordinates, such as but not limited to, rotation information and translation information. The intrinsic parameters correspond to the transformation between the camera coordinates and the image coordinates, such as but not limited to parameters of camera focal length and image center point. The camera 110 can be realized by any model and any brand of photographic lens and control module, and the present disclosure is not limited thereto.

The storage unit 120 is used for storing various codes and data required for the camera calibration system 100 to execute. In particular, the storage unit 120 can be used to store values used and generated during the camera calibration process, and can also store various coordinate transformation templates during the camera calibration process. The storage unit 120 is, for example but not limited to, any type of static or dynamic random access memory (RAM), read-only memory (ROM), flash memory, a hard disk drive (HDD), a solid state drive (SSD) or any similar components or a combination of the above components, and the disclosure is not limited thereto.

The processing unit 130 is connected to the camera 110 and the storage unit 120, and is used to receive images from the camera 110, access codes and data of the storage unit 120, perform data calculation and processing, etc., to complete various operations required by the camera calibration system 100. In particular, the processing unit 130 is configured to execute the camera calibration method of the present disclosure to transform between the image coordinates in the image coordinate system and the world coordinates in the world coordinate system. The processing unit 130 is, for example, a central processing unit (CPU), or other programmable general purpose or special purpose microprocessor, a digital signal processor (DSP), programmable controller, Application Specific Integrated Circuit (ASIC) or other similar components or a combination of the above components, and the disclosure is not limited thereto.

Figure 2:
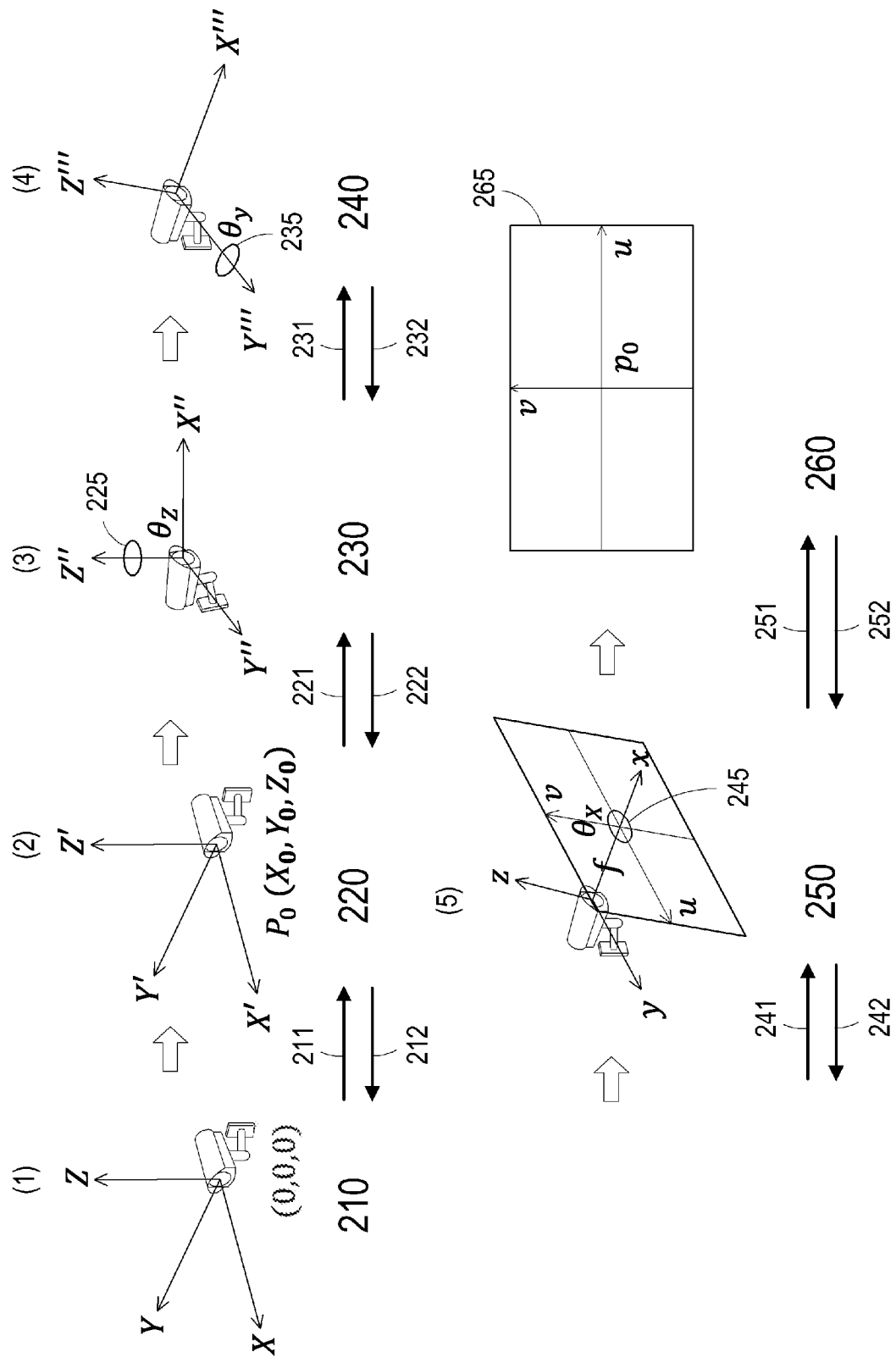
FIG. 2 and FIG. 3 are schematic diagrams of coordinate system transformation according to an exemplary embodiment of the present disclosure.

FIG. 2 is a schematic diagram of coordinate system transformation according to an exemplary embodiment of the present disclosure.

Figure 3:
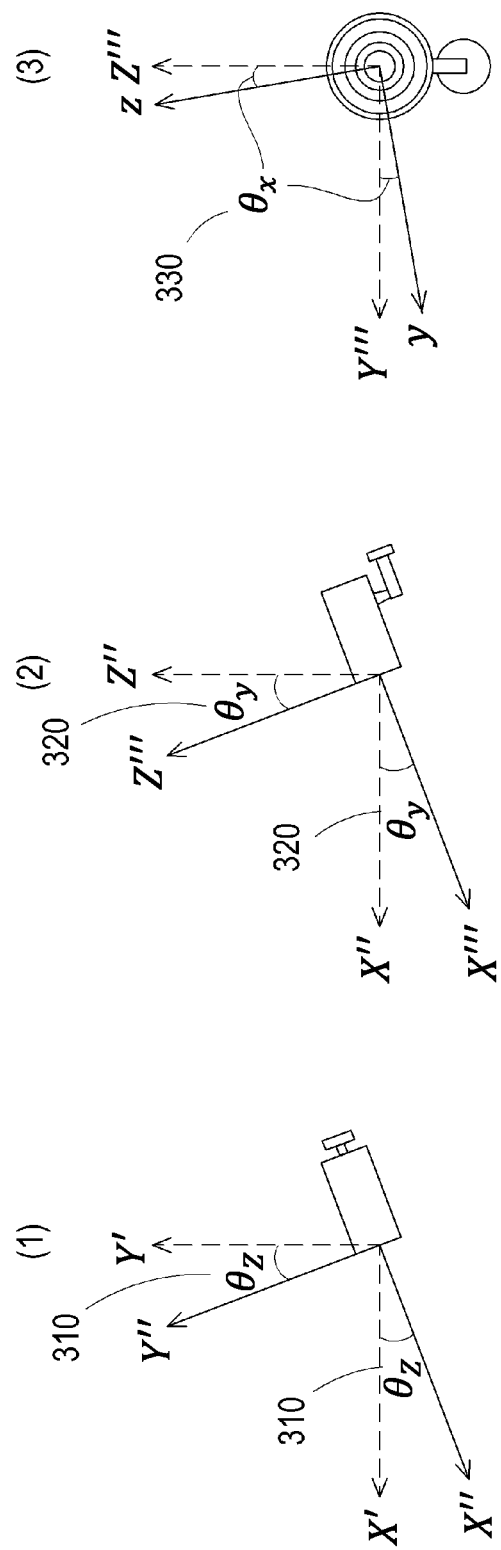

As shown in FIG. 2, during the continuous process of transforming the world coordinate system 210 to the image coordinate system 260 by the camera calibration system 100, three intermediate coordinate systems are defined. First, an operation of the translation 211 is performed on the origin (0, 0, 0) of the world coordinate system 210 and XYZ axis to the position ($X_0$, $Y_0$, $Z_0$) of the camera lens center point $P_0$ to become the first intermediate coordinate system 220. Relative to the world coordinate system 210, the directions of the X'Y'Z' axis of the first intermediate coordinate system 220 remain the same as the directions of the XYZ axis of the world coordinate system 210. In the second step, an operation of the rotation $\theta_z$ 221 is performed on the first intermediate coordinate system 220 around the Z' axis (please refer to the top view of the camera shown in (1) of FIG. 3, $\theta_z$ 310 is also called the yaw angle), so that the X" axis is aligned with the direction of the camera lens principal axis projected on the X'Y' plane of the first intermediate coordinate system 220 to become the second intermediate coordinate system 230. The Z" axis of the second intermediate coordinate system 230 maintains the same direction as the Z' axis of the first intermediate coordinate system 220, while relative to the directions of the X' axis and Y' axis of the first intermediate coordinate system 220, the directions of the X" axis and Y" axis of the second intermediate coordinate system 230 are rotated by $\theta_z$ 310. In the third step, an operation of the rotation $\theta_y$ 231 is performed on the second intermediate coordinate system 230 around the Y" axis (please refer to the side view of the camera shown in (2) of FIG. 3, $\theta_y$ 320 is also called the pitch angle), so that the X'" axis is aligned with the principal axis direction of the camera to become the third intermediate coordinate system 240. The Y'" axis of the third intermediate coordinate system 240 maintains the same direction as the Y" axis of the second intermediate coordinate system 230, while relative to the directions of the X" axis and the Z" axis of the second intermediate coordinate system 230, the directions of the X'" axis and the Z'" axis of the third intermediate coordinate system 240 are rotated by $\theta_y$ 320. In the fourth step, an operation of the rotation $\theta_x$ 241 is performed on the third intermediate coordinate system 240 around the X'" axis (please refer to the front view of the camera shown in (3) of FIG. 3, $\theta_x$ 330 is also called the roll angle), so that the directions of the y axis and the z axis respectively are aligned with the directions of the u axis and v axis of the image plane to become the camera coordinate system 250. The direction of the x axis of the camera coordinate system 250 maintains the same as the direction of the X'" axis of the third intermediate coordinate system 240, while the directions of the y axis and z axis are rotated by $\theta_x$ 330 relative to the directions of the Y'" axis and the Z'" axis of the third intermediate coordinate system 240. Finally, the image coordinate system 260 is established on the image plane 265 corresponding to the x=f plane in the space of the camera coordinate system 250, and the origin $p_0$ of the image coordinate system 260 is the intersection where the x axis of the camera coordinate system 250 passes through the said plane, and the directions of the u axis and v axis of the image coordinate system 260 are respectively equal to the directions of the y axis and z axis of the camera coordinate system 250. Based on the direction relationship corresponding to the left-handed coordinate system, the camera coordinates (f,y,z) of the camera coordinate system 250 is transformed into the image coordinates (u, v) of the image coordinate system 260, wherein the coordinate value mapping is u=y, v=z. Similarly, based on the direction relationship corresponding to the right-hand coordinate system, the camera coordinates (f,y,z) of the camera coordinate system 250 is transformed into the image coordinates (u, v) of the image coordinate system 260, wherein the coordinate value mapping is u=−y, v=z, which means x axis dimensionality reduction 251.

The origin $p_0$ of the above-mentioned image coordinate system 260 is equivalent to the vertical projection point of the camera lens center point $P_0$ on the image plane 265. This method is based on a simplified camera calibration model, assuming that the origin $p_0$ of the image coordinate system is located at the center point of the output image frame of the camera.

The camera calibration method disclosed in this disclosure can also restore the image coordinate system 260 to the world coordinate system 210. As shown in FIG. 2, the process of reversely turning back to the world coordinate system 210 from the image coordinate system 260 is as follows. First, in the image coordinate system 260, in the normal direction vertically passing through the origin $p_0$ of the image plane 265, the point $P_0$ spaced apart from $p_0$ with the distance of f is defined as the origin of the camera coordinate system 250, the direction from P₀ to p₀ is defined as the direction of the x axis of the camera coordinate system 250, and the directions of the u axis and v axis of the image coordinate system 260 are defined respectively as the directions of the y axis and z axis of the camera coordinate system 250. Based on the direction relationship corresponding to the left-handed coordinate system, the image coordinates (u, v) of the image coordinate system 260 is transformed into the camera coordinates (x,y,z) of the camera coordinate system 250 by setting x=f, y=u, z=v; and similarly, based on the direction relationship corresponding to the right-hand coordinate system, the image coordinates (x, v) of the image coordinate system 260 transformed into the camera coordinates (x,y,z) of the camera coordinate system 250 by setting x=f, y=−u, z=v, which means x axis dimensionality raising 252, and the camera coordinate system 250 is formed. In the second step, an operation of the rotation −θ$_x$ 242 is performed on the camera coordinate system 250 around the x axis to become the third intermediate coordinate system 240. Relative to the camera coordinate system 250, the X''' axis of the third intermediate coordinate system 240 maintains the same direction as the x axis of the camera coordinate system 250. In the third step, an operation of the rotation −θ$_y$ 232 is performed on the third intermediate coordinate system 240 around the Y''' axis to become the second intermediate coordinate system 230. Relative to the third intermediate coordinate system 240, the Y'' axis of the second intermediate coordinate system 230 maintains the same direction as the Y''' axis of the third intermediate coordinate system 240. In the fourth step, an operation of the rotation −θ$_z$ 222 is performed on the second intermediate coordinate system 230 around the Z'' axis to become the first intermediate coordinate system 220. Relative to the second intermediate coordinate system 230, the Z' axis of the first intermediate coordinate system 220 maintains the same direction as the Z'' axis of the second intermediate coordinate system 230. Finally, an operation of the reverse translation 212 is performed on the origin of the first intermediate coordinate system 220 and X'Y'Z' axis with (−X₀, −Y₀, −Z₀) to the origin (0, 0, 0) of the world coordinate system 210 to become the world coordinate system 210. Relative to the first intermediate coordinate system 220, the XYZ axis of the world coordinate system 210 maintain the same directions as the X'Y' Z' axis of the first intermediate coordinate system 220.

Based on the above transformation process from the image coordinate system 260 to the world coordinate system 210, given that an object in a space has the image coordinates of its projection point p* on the image plane being (u$_P$, v$_P$). When applying the left-handed coordinate system, the projection point p* on the image plane has corresponding spatial coordinates (x$_P$, y$_P$, z$_P$) based on the camera coordinate system 250 as (f, u$_P$, v$_P$).

Furthermore, the projection point p* has spatial coordinates corresponding to the second intermediate coordinate system 230 as:

$$\begin{bmatrix} X_P'' \\ Y_P'' \\ Z_P'' \end{bmatrix} = \begin{bmatrix} \cos\theta_y & 0 & \sin\theta_y \\ 0 & 1 & 0 \\ -\sin\theta_y & 0 & \cos\theta_y \end{bmatrix} \begin{bmatrix} 1 & 0 & 0 \\ 0 & \cos\theta_x & -\sin\theta_x \\ 0 & \sin\theta_x & \cos\theta_x \end{bmatrix} \begin{bmatrix} f \\ u_P \\ u_P \end{bmatrix}. \quad (1)$$

Furthermore, the projection point p* has spatial coordinates corresponding to the first intermediate coordinate system 220 as:

$$\begin{bmatrix} X_P' \\ Y_P' \\ Z_P' \end{bmatrix} = \begin{bmatrix} \cos\theta_z & -\sin\theta_z & 0 \\ \sin\theta_z & \cos\theta_z & 0 \\ 0 & 0 & 1 \end{bmatrix} \begin{bmatrix} \cos\theta_y & 0 & \sin\theta_y \\ 0 & 1 & 0 \\ -\sin\theta_y & 0 & \cos\theta_y \end{bmatrix} \begin{bmatrix} 1 & 0 & 0 \\ 0 & \cos\theta_x & -\sin\theta_x \\ 0 & \sin\theta_x & \cos\theta_x \end{bmatrix} \begin{bmatrix} f \\ u_P \\ u_P \end{bmatrix}. \quad (2)$$

Similarly, when the right-handed coordinate system is used, the projection point p* of the image plane corresponds to the spatial coordinate (x$_P$, y$_P$, z$_P$) based on the camera coordinate system 250 as (f, −u$_P$, v$_P$). Therefore, the plus-minus signs of the u$_P$ coefficients in the equation (1) and equation (2) are corresponding adjusted to opposite numbers.

In fact, the transformation from the three-dimensional coordinate system (including the world coordinate system 210, the first intermediate coordinate system 220, the second intermediate coordinate system 230, the third intermediate coordinate system 240, and the camera coordinate system 250) to the two-dimensional coordinate system (image coordinate system 260) has undergone dimensionality reduction. On the contrary, during the transformation process of transforming the image coordinate system 260 to the camera coordinate system 250, the third intermediate coordinate system 240, the second intermediate coordinate system 230, the first intermediate coordinate system 220, and the world coordinate system 210, the projection point p* is dimensionality raised to become a straight line formed from the camera lens central point P₀ and through the projection point p* on the image plane 265, and the given object in the space is located at a point on the straight line. Based on the camera coordinate system 250, the equation of the straight line is: s(x$_P$, y$_P$, z$_P$), wherein s>0. Similarly, based on the second intermediate coordinate system 230 and the first intermediate coordinate system 220, the equations of the straight line respectively are s(X$_P$'', Y$_P$'', Z$_P$'') and s(X$_P$', Y$_P$', Z$_P$'). Furthermore, based on the world coordinate system 210, the equation of the straight line corresponding to the projection point p* is:

$$\begin{bmatrix} X_P \\ Y_P \\ Z_P \end{bmatrix} = s \begin{bmatrix} X_P' \\ Y_P' \\ Z_P' \end{bmatrix} + \begin{bmatrix} X_0 \\ Y_0 \\ Z_0 \end{bmatrix}. \quad (3)$$

Figure 4:
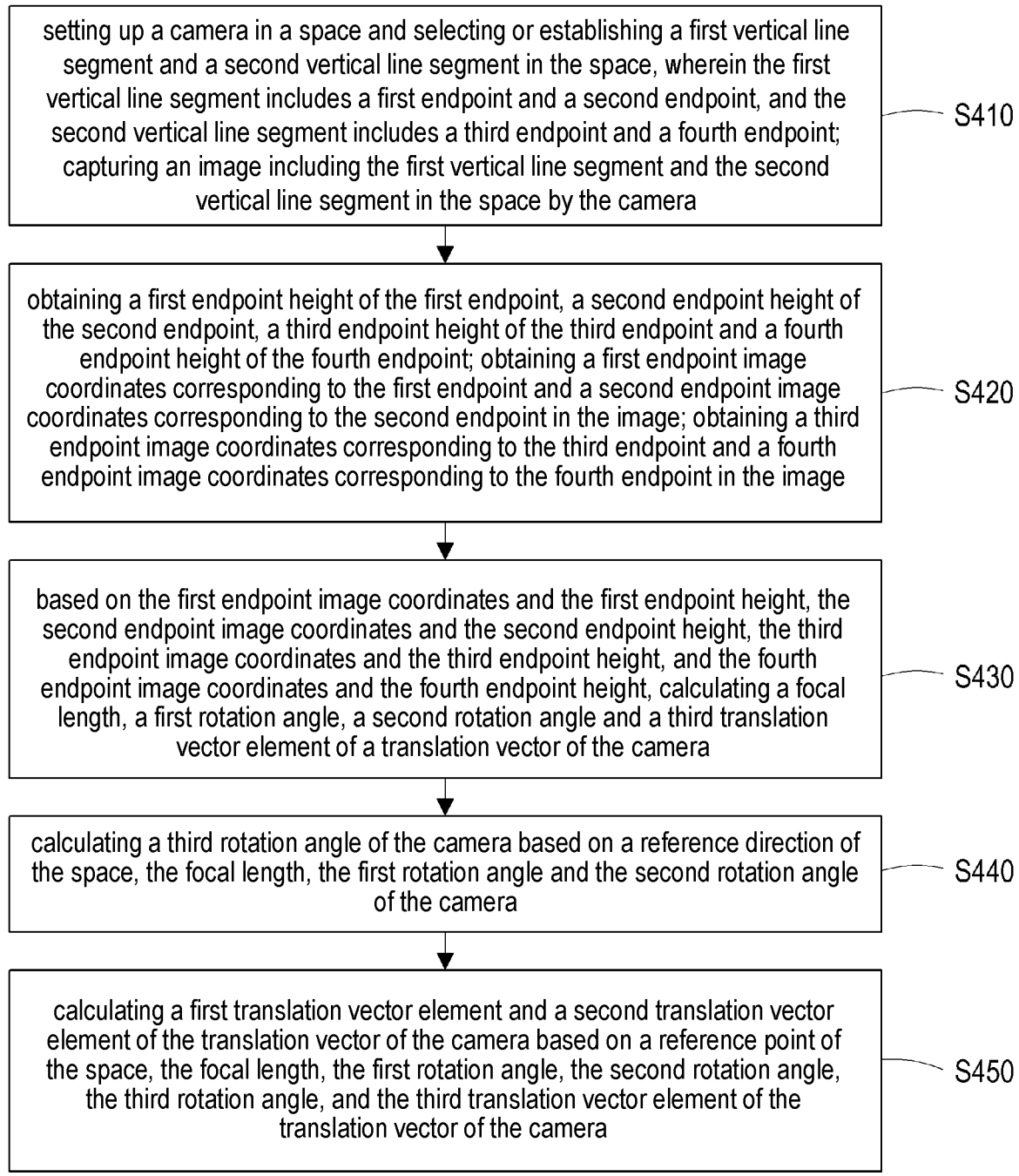
FIG. 4 is a flowchart of a camera calibration method according to an exemplary embodiment of the present disclosure.

FIG. 4 is a flowchart of a camera calibration method according to an exemplary embodiment of the present disclosure.

The main process of the camera calibration method disclosed in this disclosure is divided into three stages as follows. In the first stage, the rotation angle θ$_x$ of X axis, the rotation angle θ$_y$ of Y axis, the focal length f, and t$_z$ of the translation vector $\vec{t}$=(t$_x$, t$_y$, t$_z$) of the camera are calculated based on the information of two different vertical line segments. In the second stage, the rotation angle θ$_z$ of Z axis of the camera is calculated based on a reference direction and the rotation angle θ$_x$ of X axis, the rotation angle θ$_y$ of Y axis and the focal length f of the camera. In the third stage, t$_x$ and t$_y$ of the translation vector $\vec{t}$ are calculated based on a reference point and the focal length f and the rotation angle θ$_x$ of X axis, the rotation angle θ$_y$ of Y axis, the rotation angle θ$_z$ of Z axis, and t$_z$ of the translation vector $\vec{t}$..

The three element values of the above-mentioned translation vector $\vec{t}=(t_x, t_y, t_z)$ are equivalent to the three coordinate values of the camera lens central point $P_0=(X_0, Y_0, Z_0)$, that is, $t_x=X_0$, $t_y=Y_0$, $t_z=Z_0$. The rotation angle $\theta_x$ of X axis of the camera above is also called the roll angle, the rotation angle $\theta_y$ of Y axis of the camera is also called the pitch angle, and the rotation angle $\theta_z$ of Z axis of the camera is also called the yaw angle.

Please refer to FIG. 4, in step S410, a camera is set up in a space, and a first vertical line segment and a second vertical line segment are selected or established in the space, wherein the first vertical line segment includes a first endpoint and a second endpoint, and the second vertical line segment includes a third endpoint and a fourth endpoint; the camera captures an image including the first vertical line segment and the second vertical line segment in the space, and in step S420, a first endpoint height of the first endpoint, a second endpoint height of the second endpoint, a third endpoint height of the third endpoint and a fourth endpoint height of the fourth endpoint are obtained; a first endpoint image coordinates corresponding to the first endpoint and a second endpoint image coordinates corresponding to the second endpoint in the image are obtained; a third endpoint image coordinates corresponding to the third endpoint and a fourth endpoint image coordinates corresponding to the fourth endpoint in the image are obtained.

Figure 5:
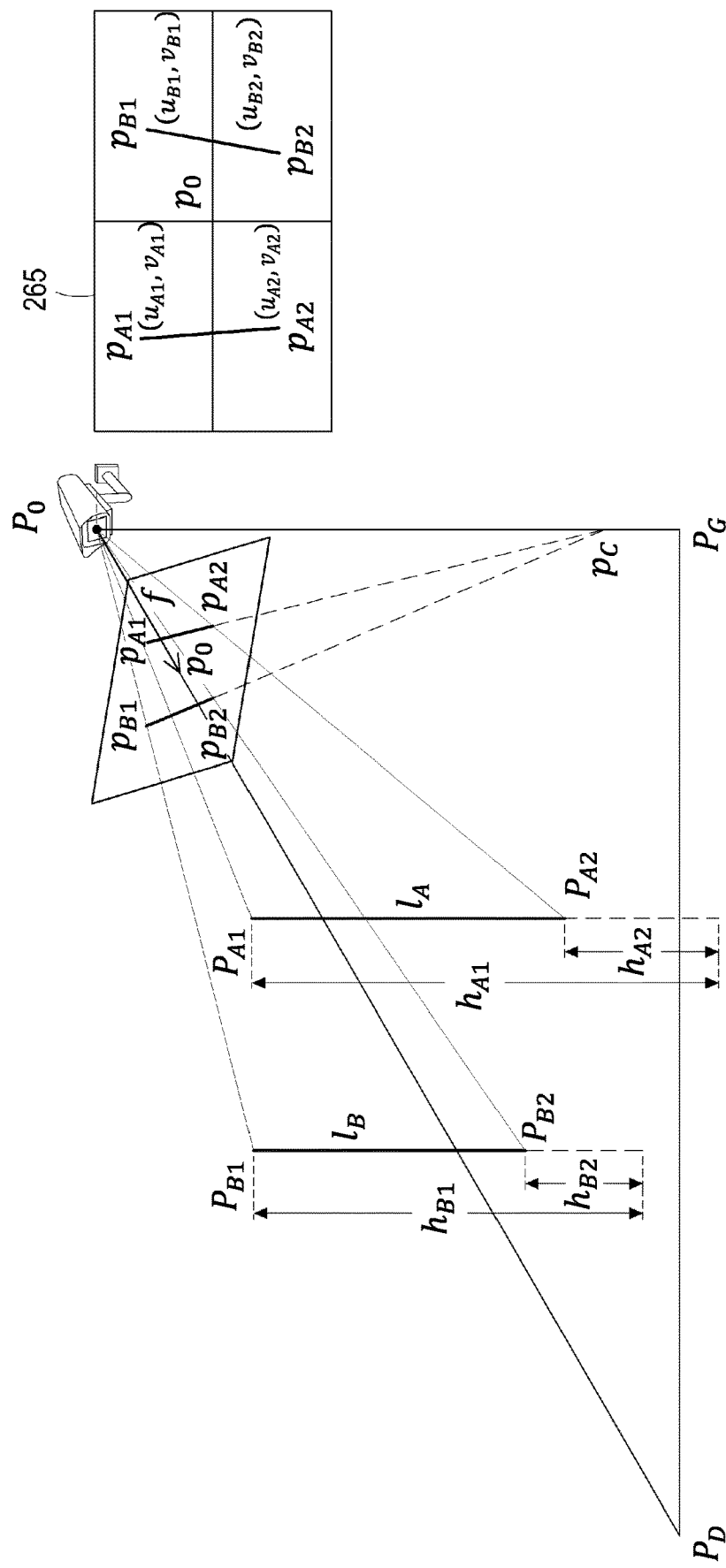
FIG. 5 is a schematic diagram of obtaining information of two vertical line segments according to an exemplary embodiment of the present disclosure.

FIG. 5 is a schematic diagram of obtaining information of two vertical line segments according to an exemplary embodiment of the present disclosure.

As shown in FIG. 5, a camera is set up in a space, the projection point of the camera lens central point $P_0$ on the ground is $P_G$, and the principal axis of the camera lens intersects the ground at intersection $P_D$. Two vertical line segments $\overline{P_{A1}P_{A2}}$ and vertical line segment $\overline{P_{B1}P_{B2}}$ perpendicular to the ground in the space are given, the heights of the upper and lower endpoints $P_{A1}$ and $P_{A2}$ of the vertical line segment $\overline{P_{A1}P_{A2}}$ from the ground respectively are $h_{A1}$ and $h_{A2}$, wherein $h_{A1}>h_{A2}$; the heights of the upper and lower endpoints $P_{B1}$ and $P_{B2}$ of the vertical line segment $\overline{P_{B1}P_{B2}}$ from the ground respectively are $h_{B1}$ and $h_{B2}$, wherein $h_{B1}>h_{B2}$. The image plane 265 is located directly in front of the camera lens central point $P_0$ and the distance between the image plane 265 and the camera lens central point $P_0$ is equal to one focal length f, that is to say, the line segment $\overline{P_0p_0}$ is perpendicular to the image plane 265, and the length of the line segment $\overline{P_0p_0}$ is equal to the focal length f. The projection point coordinates of the upper and lower endpoints of the vertical line segment $\overline{P_{A1}P_{A2}}$ on the image plane 265 respectively are $p_{A1}=(u_{A1}, v_{A1})$ and $p_{A2}=(u_{A2}, v_{A2})$; the projection point coordinates of the upper and lower endpoints of the vertical line segment $\overline{P_{B1}P_{B2}}$ on the image plane 265 respectively are $p_{B1}=(u_{B1}, v_{B1})$ and $p_{B2}=(u_{B2}, v_{B2})$. Assume that in the image plane 265, the projection line segment $\overline{p_{A1}p_{A2}}$ of the vertical line segment $\overline{P_{A1}P_{A2}}$ is located to the left of the projection line segment $\overline{p_{B1}p_{B2}}$ of the vertical line segment $\overline{P_{B1}P_{B2}}$.

Next, please refer to FIG. 4 again, in step S430, based on the first endpoint image coordinates and the first endpoint height, the second endpoint image coordinates and the second endpoint height, the third endpoint image coordinates and the third endpoint height, and the fourth endpoint image coordinates and the fourth endpoint height, a focal length, a first rotation angle, a second rotation angle, and a third translation vector element of the translation vector of the camera are calculated. Here, step S430 is the step of the first-stage camera calibration of the camera calibration method disclosed herein.

Figure 6:
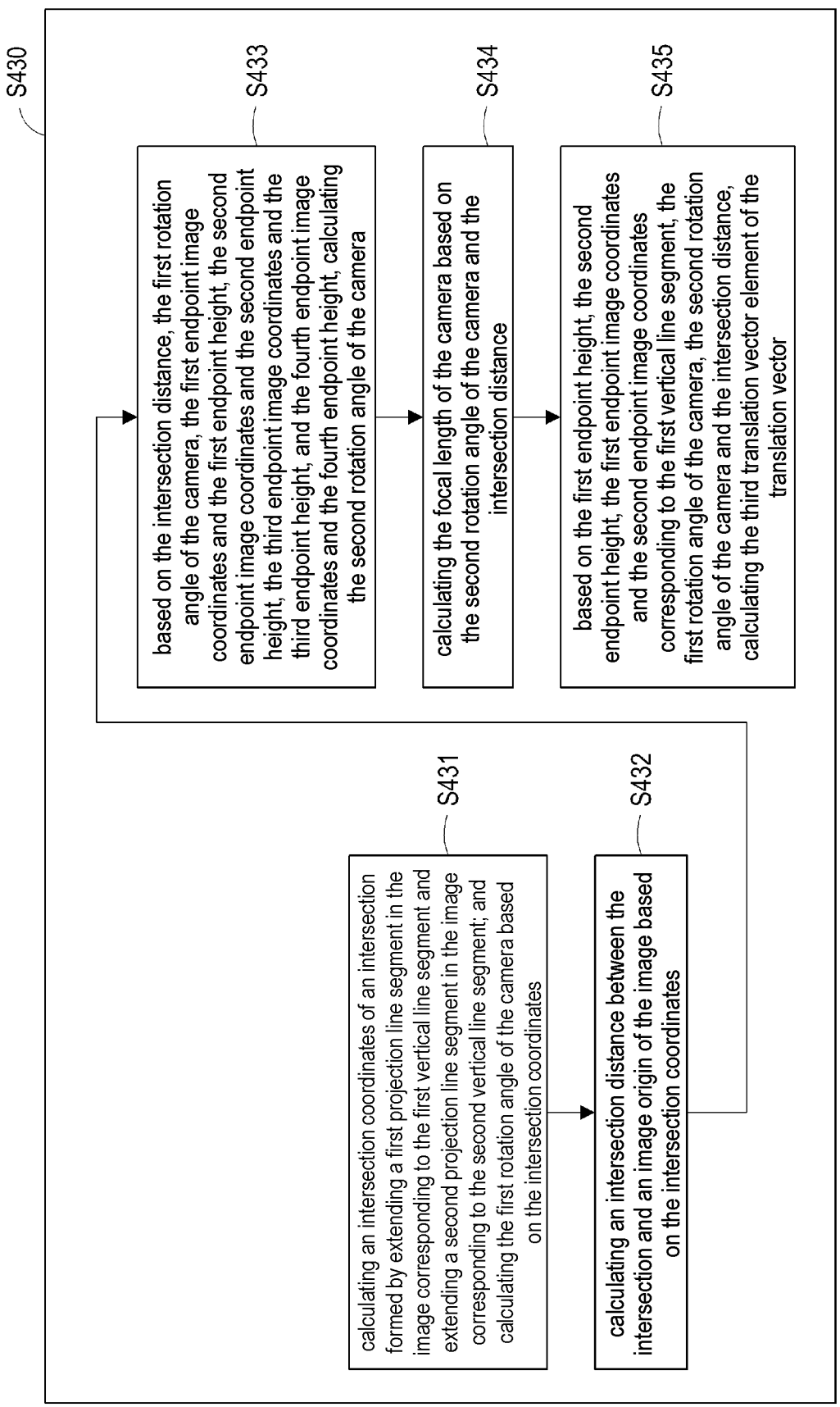
FIG. 6 is a detailed flowchart of the first-stage camera calibration according to an exemplary embodiment of the present disclosure.

FIG. 6 is a detailed flowchart of the first-stage camera calibration based on an exemplary embodiment of the present disclosure.

Please refer to FIG. 6, in step S431, an intersection coordinates of an intersection formed by extending a first projection line segment in the image corresponding to the first vertical line segment and extending a second projection line segment in the image corresponding to the second vertical line segment is calculated; and the first rotation angle of the camera is calculated based on the intersection coordinates.

Please refer to FIG. 5 and FIG. 7, the processing unit uses the information of $p_{A1}=(u_{A1}, v_{A1})$, $p_{A2}=(u_{A2}, v_{A2})$, $p_{B1}=(u_{B1}, v_{B1})$ and $p_{B2}=(u_{B2}, v_{B2})$ on the image plane 265 to calculate the rotation angle $\theta_x$ of X axis of the camera. The calculation process is based on the image coordinate system 260.

The equation of the straight line $L_A(u, v)$ passing through two points $p_{A1}$ and $p_{A2}$ on the image plane is:

$$L_A(u, v) = u + a_A v + b_A = 0. \qquad (4)$$

Wherein $$a_A = \frac{u_{A1} - u_{A2}}{v_{A2} - v_{A1}}$$

$$b_A = \frac{u_{A2}v_{A1} - u_{A1}v_{A2}}{v_{A2} - v_{A1}}.$$

Similarly, the equation of the straight line $L_B(u, v)$ passing through two points $p_{B1}$ and $p_{B2}$ is:

$$L_B(u, v) = u + a_B v + b_B = 0. \qquad (5)$$

Wherein $$a_B = \frac{u_{B1} - u_{B2}}{v_{B2} - v_{B1}}$$

$$b_B = \frac{u_{B2}v_{B1} - u_{B1}v_{B2}}{v_{B2} - v_{B1}}.$$

The coordinates of the intersection $p_C$ of the straight lines $L_A(u, v)$ and $L_B(u, v)$ is:

$$p_C = \left( \frac{a_A b_B - a_B b_A}{a_B - a_A}, \frac{b_A - b_B}{a_B - a_A} \right). \qquad (6)$$

In a physical significance, $p_C$ represents the vanishing point of Z axis. When the camera takes a view at a depression angle, any plumb line in the space extending infinitely downwards disappears at intersection $p_C$ on the image plane; and in the world coordinate system 210, as shown in FIG. 5, $p_C$ on the image plane 265 corresponds to the intersection of the plumb line directly below the camera lens center point $P_0$ passing through the image plane 265. Similarly, when the camera is viewed at an elevation angle, any plumb line in space extending infinitely upwards disappears at $p_C$ on the image plane; and in the world coordinate system 210, $p_C$ on the image plane 265 corresponds to the intersection of the plumb line directly above the camera lens center point $P_0$ passing through the image plane 265.

Figure 8:
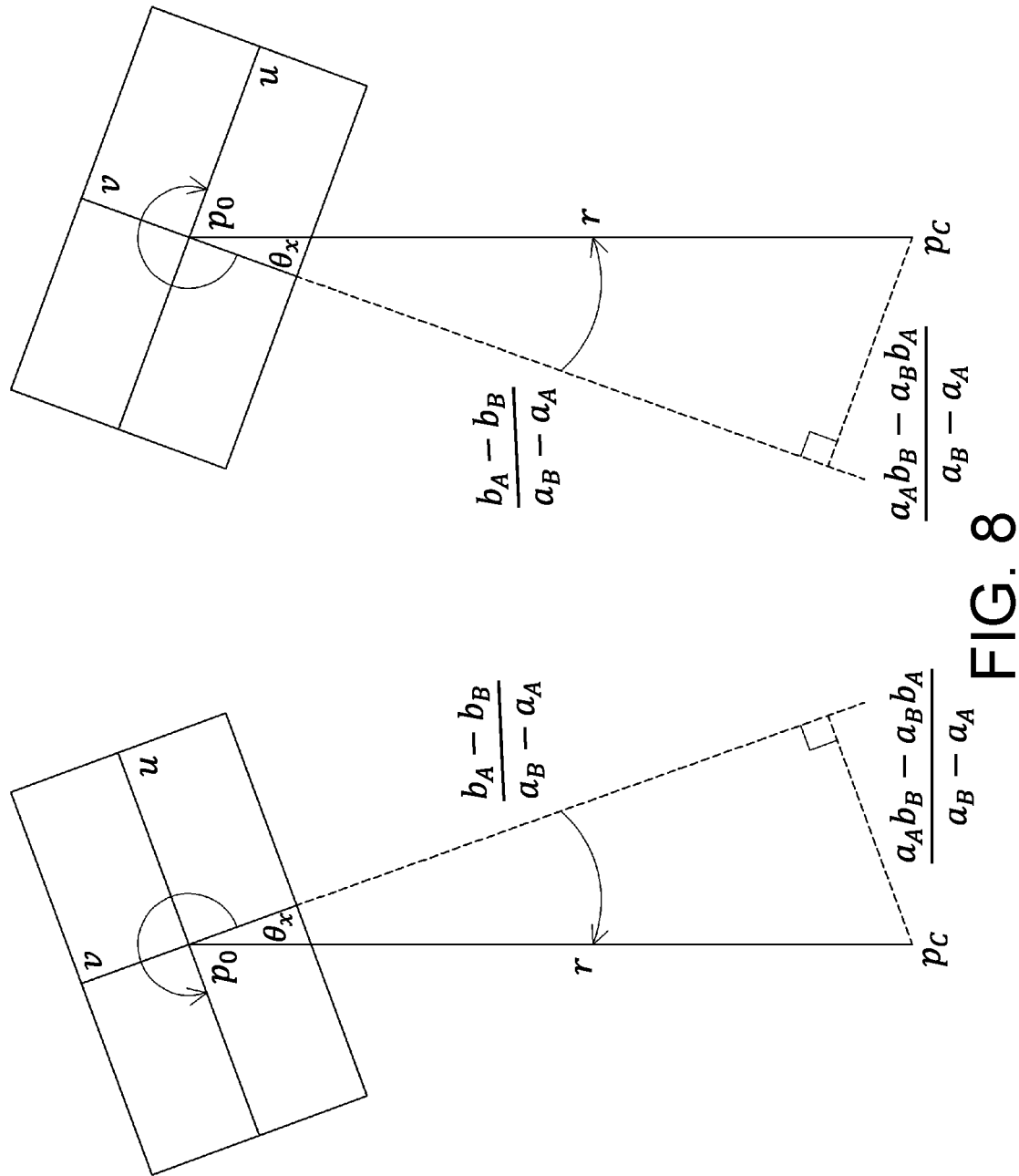
FIG. 8 is a schematic diagram of calculating a first rotation angle according to an exemplary embodiment of the present disclosure.

FIG. 7 is a schematic diagram of calculating an intersection according to an exemplary embodiment of the present disclosure, and FIG. 8 is a schematic diagram of calculating a first rotation angle according to an exemplary embodiment of the present disclosure.

Please refer to FIG. 7 and FIG. 8, because the plumb direction keeps fixed as the camera rotates around the x-axis, the rotation angle $\theta_x$ is the included angle between the straight line $\overline{p_0 p_C}$ and the v axis on the image plane 265. Based on the left-handed coordinate system, the rotation angle $\theta_x$ increases when the camera rotates counterclockwise around the x-axis. In such case, for the camera with a depression angle view, $p_C$ on the image plane rotates around the origin $p_0$ of the image plane clockwise from a point on the negative v-axis to the third quadrant (tangent value is positive); similarly, for a camera with an elevation angle view, $p_C$ on the image plane rotates around the origin $p_0$ of the image plane clockwise from a point on the positive v-axis to the first quadrant (tangent value is also positive). Therefore, based on the coordinate equation (6) of the intersection $p_C$, the tangent value of the rotation angle $\theta_x$ of X axis is:

$$\tan\theta_x = \frac{\frac{a_A b_B - a_B b_A}{a_B - a_A}}{\frac{b_A - b_B}{a_B - a_A}} = \frac{a_A b_B - a_B b_A}{b_A - b_B}. \tag{7}$$

As such, $\theta_x$ is obtained as $$\theta_x = \tan^{-1}\frac{a_A b_B - a_B b_A}{b_A - b_B}.$$

When the right-handed coordinate system is used, the clockwise rotation of the camera around the x axis corresponds to the increase of $\theta_x$. Therefore, $\theta_x$ obtained based on the right-handed coordinate system is the opposite number of equation (7).

Referring to FIG. 6 again, in step S432, an intersection distance between the intersection and an image origin of the image is calculated based on the intersection coordinates. The intersection distance r is expressed as the distance between the image origin $p_0$ and the intersection $p_C$ on the image plane 265. Based on the coordinates of the intersection $p_C$ in equation (6), the intersection distance r is obtained as $$r = \frac{\sqrt{(a_A b_B - a_B b_A)^2 + (b_A - b_B)^2}}{a_A - a_B}. \tag{8}$$

Please refer to FIG. 6 again, in step S433, based on the intersection distance, the first rotation angle of the camera, the first endpoint image coordinates and the first endpoint height, the second endpoint image coordinates and the second endpoint height, the third endpoint image coordinates and the third endpoint height, and the fourth endpoint image coordinates and the fourth endpoint height, the second rotation angle of the camera is calculated. In other words, based on the rotation angle $\theta_x$ of X axis of the camera, the heights $h_{A1}$, $h_{A2}$, $h_{B1}$, $h_{B2}$ of the upper and lower endpoints and the image coordinates of the upper and lower projection endpoints $p_{A1}$, $p_{A2}$, $p_{B1}$ and $p_{B2}$ of the line segment $\overline{P_{A1}P_{A2}}$ and the line segment $\overline{P_{B1}P_{B2}}$, the rotation angle $\theta_y$ of Y axis of the camera is calculated. This calculation process is based on the second intermediate coordinate system 230.

The image coordinates of $p_{A1}$, $p_{A2}$, $p_{B1}$ and $p_{B2}$ on the image plane are respectively transformed into coordinates of the second intermediate coordinate system 230. Based on the left-handed coordinate system, according to equation (1), the second intermediate coordinates of $p_{A1}$, $p_{A2}$, $p_{B1}$ and $p_{B2}$ are respectively:

$$\begin{bmatrix} X''_{A1} \\ Y''_{A1} \\ Z''_{A1} \end{bmatrix} = \begin{bmatrix} f\cos\theta_y + u_{A1}\sin\theta_x\sin\theta_y + v_{A1}\cos\theta_x\sin\theta_y \\ u_{A1}\cos\theta_x - v_{A1}\sin\theta_x \\ -f\sin\theta_y + u_{A1}\sin\theta_x\cos\theta_y + v_{A1}\cos\theta_x\cos\theta_y \end{bmatrix} \tag{9}$$

$$\begin{bmatrix} X''_{A2} \\ Y''_{A2} \\ Z''_{A2} \end{bmatrix} = \begin{bmatrix} f\cos\theta_y + u_{A2}\sin\theta_x\sin\theta_y + v_{A2}\cos\theta_x\sin\theta_y \\ u_{A2}\cos\theta_x - v_{A2}\sin\theta_x \\ -f\sin\theta_y + u_{A2}\sin\theta_x\cos\theta_y + v_{A2}\cos\theta_x\cos\theta_y \end{bmatrix}$$

$$\begin{bmatrix} X''_{B1} \\ Y''_{B1} \\ Z''_{B1} \end{bmatrix} = \begin{bmatrix} f\cos\theta_y + u_{B1}\sin\theta_x\sin\theta_y + v_{B1}\cos\theta_x\sin\theta_y \\ u_{B1}\cos\theta_x - v_{B1}\sin\theta_x \\ -f\sin\theta_y + u_{B1}\sin\theta_x\cos\theta_y + v_{B1}\cos\theta_x\cos\theta_y \end{bmatrix}$$

$$\begin{bmatrix} X''_{B2} \\ Y''_{B2} \\ Z''_{B2} \end{bmatrix} = \begin{bmatrix} f\cos\theta_y + u_{B2}\sin\theta_x\sin\theta_y + v_{B2}\cos\theta_x\sin\theta_y \\ u_{B2}\cos\theta_x - v_{B2}\sin\theta_x \\ -f\sin\theta_y + u_{B2}\sin\theta_x\cos\theta_y + v_{B2}\cos\theta_x\cos\theta_y \end{bmatrix}.$$

When the right-handed coordinate system is used, the signs of $u_{A1}$, $u_{A2}$, $u_{B1}$ and $u_{B2}$ coefficients are corresponding adjusted to opposite numbers.

Please refer to FIG. 2 again, the Z" axis of the second intermediate coordinate system 230 maintains the same direction as the Z axis of the world coordinate system 210, so the relative height difference of any two points in the space in the second intermediate coordinate system 230 maintains the same as that in the world coordinate system 210.

Figure 9:
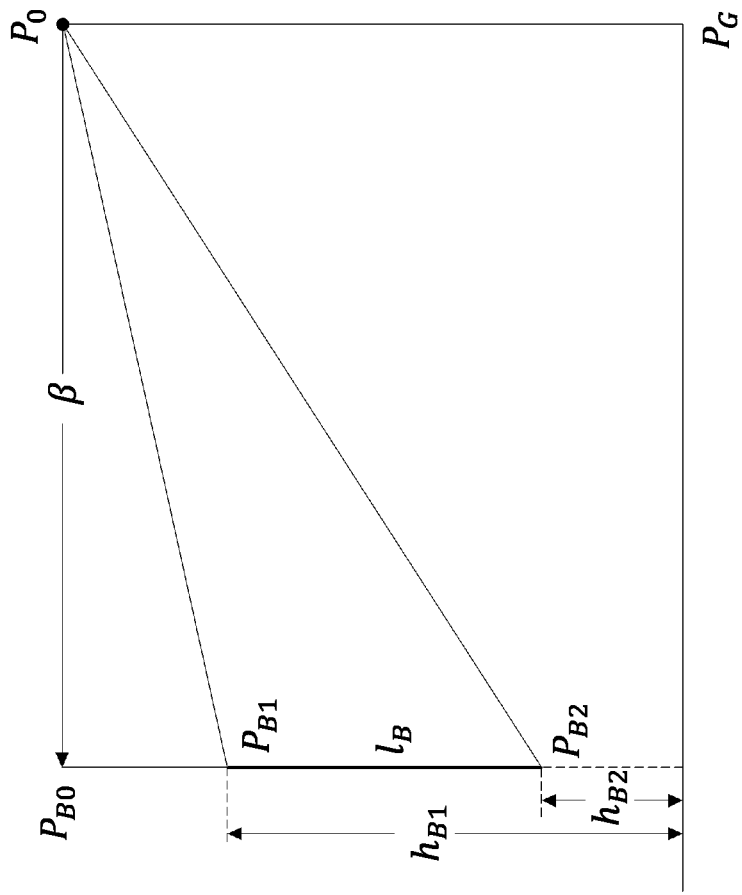
FIG. 9 is a schematic diagram showing the relationship between the height differences between the endpoints of two vertical line segments in the second intermediate coordinate system and the world coordinate system according to an exemplary embodiment of the present disclosure.
Figure 9:
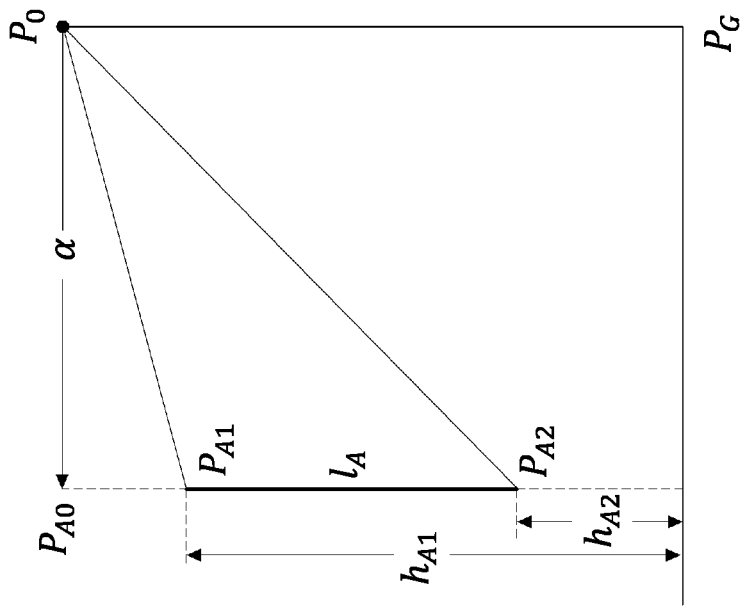

FIG. 9 is a schematic diagram showing the relationship between the height difference between the endpoints of two vertical line segments in the second intermediate coordinate system and the world coordinate system based on an exemplary embodiment of the present disclosure.

Please refer to FIG. 9, $\alpha$ is the horizontal distance between the camera lens center point $P_0$ and the line segment $\overline{P_{A1}P_{A2}}$, and $P_{A0}$ is the point on the extended line segment $\overline{P_{A1}P_{A2}}$ with height the same as the camera lens center point $P_0$; $\beta$ is the horizontal distance between the camera lens center point $P_0$ and the line segment $\overline{P_{B1}P_{B2}}$, and $P_{B0}$ is the point on the extended line segment $\overline{P_{B1}P_{B2}}$ with height the same as the camera lens center point $P_0$. Using the ratio of the vertical component and the horizontal component of the second intermediate coordinates of $p_{A1}$, $p_{A2}$, $p_{B1}$, and $p_{B2}$, the equations (10), (11) and (12) are obtained as follows:

$$\alpha\left(\frac{Z''_{A1}}{\sqrt{X''^2_{A1} + Y''^2_{A1}}} - \frac{Z''_{A2}}{\sqrt{X''^2_{A2} + Y''^2_{A2}}}\right) = l_A \tag{10}$$

$$\beta\left(\frac{Z''_{B1}}{\sqrt{X''^2_{B1} + Y''^2_{B1}}} - \frac{Z''_{B2}}{\sqrt{X''^2_{B2} + Y''^2_{B2}}}\right) = l_B \tag{11}$$

$$\alpha\frac{Z''_{A1}}{\sqrt{X''^2_{A1} + Y''^2_{A1}}} - \beta\frac{Z''_{B1}}{\sqrt{X''^2_{B1} + Y''^2_{B1}}} = h_{A1} - h_{B1}. \tag{12}$$

Wherein, $l_A = (h_{A1} - h_{A2})$ is the length of the line segment $\overline{P_{A1}P_{A2}}$, and $l_B = (h_{B1} - h_{B2})$ is the length of the line segment $\overline{P_{B1}P_{B2}}$.

The equation (10) means that subtraction of the height difference from $P_{A0}$ to $P_{A1}$ with the height difference from $P_{A0}$ to $P_{A2}$ is equal to the length $l_A$ of the vertical line segment $\overline{P_{A1}P_{A2}}$, and the equation (11) means that subtraction of the height difference from $P_{B0}$ to $P_{B1}$ with the height difference from $P_{B0}$ to $P_{B2}$ is equal to the length $l_B$ of the vertical line segment $\overline{P_{B1}P_{B2}}$. Specifically, when the image coordinates of the projection points $p_{A1}$, $p_{A2}$, $p_{B1}$, and $p_{B2}$ of the two vertical line segments are respectively restored to the spatial coordinates of the second intermediate coordinate system 230, based on the ratio relationship of the vertical component and the horizontal component, the first item on the left side of the equation (10) represents the height difference from $P_{A0}$ to $P_{A1}$, and the second term represents the height difference from $P_{A0}$ to $P_{A2}$, and subtraction of the two is equal to the length $l_A$ of the vertical line segment $\overline{P_{A1}P_{A2}}$; the first item on the left side of the equation (11) represents the height difference from $P_{B0}$ to $P_{B1}$, and the second term represents the height difference from $P_{B0}$ to $P_{B2}$, and subtraction of the two is equal to the length $l_B$ of the vertical line segment $\overline{P_{B1}P_{B2}}$.

The equation (12) means that subtraction of the height difference from $P_{A0}$ to $P_{A1}$ with the height difference from $P_{B0}$ to $P_{B1}$ is equal to $h_{A1}-h_{B1}$. Specifically, the endpoint heights $h_{A1}$, $h_{A2}$, $h_{B1}$, and $h_{B2}$ of the line segment $\overline{P_{A1}P_{A2}}$ and the line segment $\overline{P_{B1}P_{B2}}$ are defined with the same ground plane basis, that is, the line segment $\overline{P_{A1}P_{A2}}$ and the line segment $\overline{P_{B1}P_{B2}}$ are both perpendicular to the same ground plane. Although the equation (12) is an equation set based on the height correlation between the upper endpoint $P_{A1}$ of the line segment $\overline{P_{A1}P_{A2}}$ and the upper endpoint $P_{B1}$ of the line segment $\overline{P_{B1}P_{B2}}$, in fact, as long as any combination of upper and lower endpoints on the line segment $\overline{P_{A1}P_{A2}}$ and the line segment $\overline{P_{B1}P_{B2}}$ can be set as the corresponding equation as the equation (12), and this disclosure does not limit the selection of individual line segment endpoints.

In the process of solving simultaneous equations (10)-(12), the correlation between the unknowns to be solved is set based on the geometric correlation obtained from the side view and the top view respectively.

Figure 10:
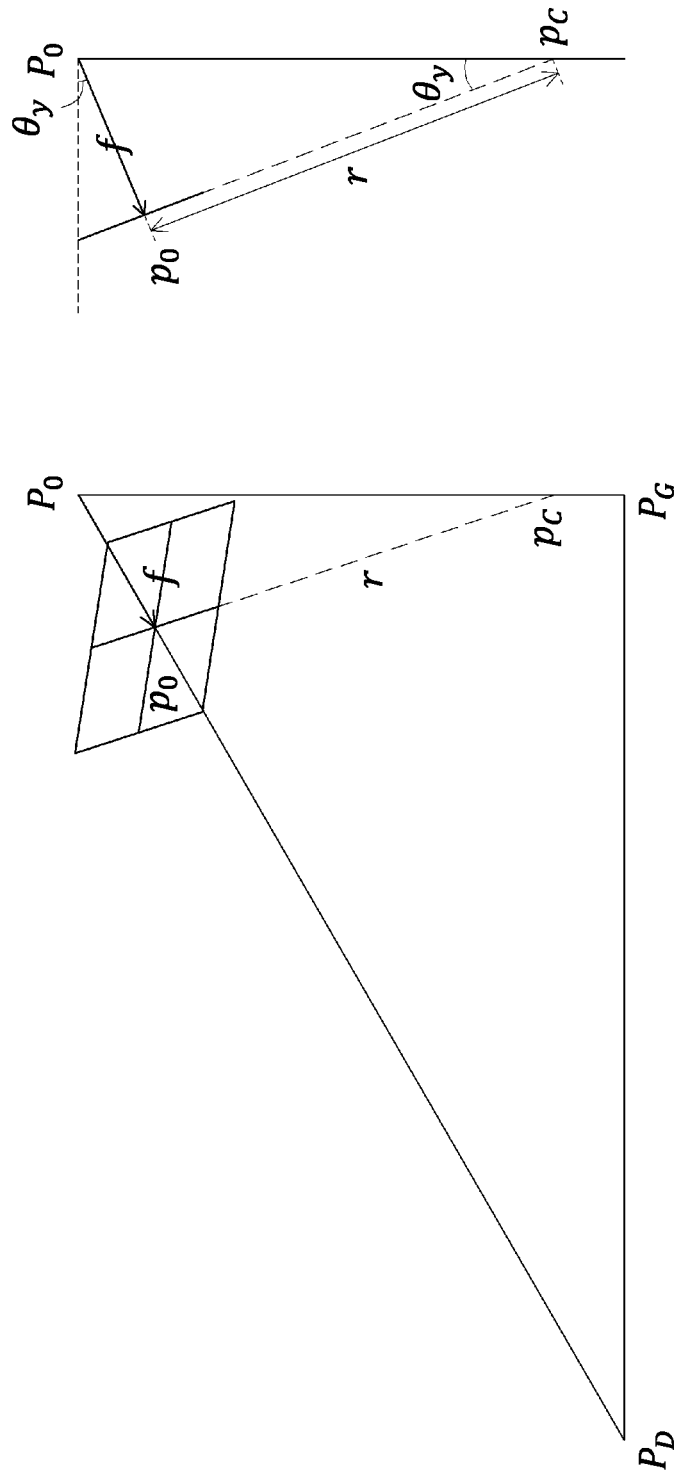
FIG. 10 is a schematic diagram showing the relationship between the second rotation angle and the focal length of the camera according to an exemplary embodiment of the present disclosure.

FIG. 10 is a schematic diagram showing the relationship between the second rotation angle and the focal length of the camera according to an exemplary embodiment of the present disclosure.

Please refer to FIG. 10, FIG. 10 shows that from the perspective of the side view, the relationship between the camera lens center point $P_0$ and the image plane 265 in the world coordinate system 210 when the camera takes a view at a depression angle, and then the relationship between the rotation angle $\theta_y$ of Y axis of the camera and the focal length f of the camera is obtained. As shown in FIG. 10, when the camera takes a view at a depression angle, $p_c$ on the image plane in the three-dimensional space corresponds to the intersection where the plumb line directly below the camera lens center point $P_0$ passing through the image plane 265. Similarly, when the camera is viewed at an elevation angle, $p_c$ on the image plane in the three-dimensional space corresponds to the intersection where the plumb line directly above the camera lens center point $P_0$ passing through the image plane 265. Therefore, $$\theta_y = \frac{f}{r}$$

Wherein, the focal length f of the camera is equivalent to the length of the line segment $\overline{P_0p_0}$, and r is the intersection distance defined by equation (8), which is equivalent to the length of the line segment $\overline{p_0p_c}$. Based on equation (4) and equation (5), the line $L_A$ and line $L_B$ on the image plane respectively intersect the u axis at $(-b_A, 0)$ and $(-b_B, 0)$, and because the line segment $\overline{p_{A1}p_{A2}}$ is at left side of the line segment $\overline{p_{B1}p_{B2}}$, so $$b_A > b_B \tag{14}$$

When the camera is viewed at an elevation angle, the v coordinate value of the intersection $p_C$ is greater than 0, and $a_A < a_B$ is obtained based on equation (6) and equation (14), and then $r<0$ is obtained based on equation (8), and $\theta_y<0$ is obtained based on equation (13); similarly, when the camera takes a view at a depression angle, the v coordinate value of the intersection $p_C$ is less than 0, and $a_A > a_B$ is obtained based on equation (6) and equation (14), and then $r>0$ is obtained based on equation (8), and $\theta_y>0$ is obtained based on equation (13).

Based on equation (13):

$$f = r\frac{\sin\theta_y}{\cos\theta_y}.$$

And substitute it into equation (9), the coordinate of $P_{A1}$ in the second intermediate coordinate system 230 is obtained as:

$$\begin{bmatrix} X''_{A1} \\ Y''_{A1} \\ Z''_{A1} \end{bmatrix} = \begin{bmatrix} r\sin\theta_y + u_{A1}\sin\theta_x\sin\theta_y + v_{A1}\cos\theta_x\sin\theta_y \\ u_{A1}\cos\theta_x - v_{A1}\sin\theta_x \\ -r\frac{\sin^2\theta_y}{\cos\theta_y} + u_{A1}\sin\theta_x\cos\theta_y + v_{A1}\cos\theta_x\cos\theta_y \end{bmatrix}$$

$$= \begin{bmatrix} \sin\theta_y + (r + u_{A1}\sin\theta_x + v_{A1}\cos\theta_x) \\ u_{A1}\cos\theta_x - v_{A1}\sin\theta_x \\ -r\frac{1-\cos^2\theta_y}{\cos\theta_y} + u_{A1}\sin\theta_x\cos\theta_y + v_{A1}\cos\theta_x\cos\theta_y \end{bmatrix}.$$

$$= \begin{bmatrix} \sin\theta_y(r + u_{A1}\sin\theta_x\sin\theta_y + v_{A1}\cos\theta_x) \\ u_{A1}\cos\theta_x - v_{A1}\sin\theta_x \\ \cos\theta_y(r + u_{A1}\sin\theta_x + v_{A1}\cos\theta_x) - \frac{r}{\cos\theta_y} \end{bmatrix}$$

After sorting, equation (15) is got:

$$\begin{bmatrix} X''_{A1} \\ Y''_{A1} \\ Z''_{A1} \end{bmatrix} = \begin{bmatrix} s_{A1}\sin\theta_y \\ u_{A1}\cos\theta_x - v_{A1}\sin\theta_x \\ s_{A1}\cos\theta_y - \frac{r}{\cos\theta_y} \end{bmatrix}. \tag{15}$$

Wherein:

$$s_{A1} = r + u_{A1}\sin\theta_x + v_{A1}\cos\theta_x.$$

Similarly, in equation (9), the coordinates of the other three points $p_{A2}$, $p_{B1}$ and $p_{B2}$ in the second intermediate coordinate system 230 are respectively:

$$\begin{bmatrix} X''_{A2} \\ Y''_{A2} \\ Z''_{A2} \end{bmatrix} = \begin{bmatrix} s_{A2}\sin\theta_y \\ u_{A2}\cos\theta_x - v_{A2}\sin\theta_x \\ s_{A2}\cos\theta_y - \frac{r}{\cos\theta_y} \end{bmatrix} \tag{16}$$

$$\begin{bmatrix} X''_{B1} \\ Y''_{B1} \\ Z''_{B1} \end{bmatrix} = \begin{bmatrix} s_{B1}\sin\theta_y \\ u_{B1}\cos\theta_x - v_{B1}\sin\theta_x \\ s_{B1}\cos\theta_y - \frac{r}{\cos\theta_y} \end{bmatrix} \tag{17}$$

-continued $$\begin{bmatrix} X''_{B2} \\ Y''_{B2} \\ Z''_{B2} \end{bmatrix} = \begin{bmatrix} s_{B2}\sin\theta_y \\ u_{B2}\cos\theta_x - v_{B2}\sin\theta_x \\ s_{B2}\cos\theta_y - \dfrac{r}{\cos\theta_y} \end{bmatrix} \quad (18)$$

Wherein, $$s_{A2} = r + u_{A2}\sin\theta_x + v_{A2}\cos\theta_x$$

$$s_{B1} = r + u_{B1}\sin\theta_x + v_{B1}\cos\theta_x$$

$$s_{B2} = r + u_{B2}\sin\theta_x + v_{B2}\cos\theta_x.$$

When the right-handed coordinate system is used, the signs of $u_{A1}$, $u_{A2}$, $u_{B1}$ and $u_{B2}$ coefficients included in $s_{A1}$, $s_{A2}$, $s_{B1}$ and $s_{B2}$ are corresponding adjusted to opposite numbers.

It should be noted that $s_{A1}$ is equivalent to the distance between the projection point of $p_{A1}$ on the straight line $\overline{p_0 p_C}$ and the intersection $p_C$ in the image plane. Similarly, $s_{A2}$, $s_{B1}$, and $s_{B2}$ are respectively equivalent to the distances between the projection points of $p_{A2}$, $p_{B1}$ and $p_{B2}$ on the straight line $p_0 p_C$ and the intersection $p_C$.

Next, from the perspective of the top view, the coordinate relationship of the projection points of the upper and lower ends of the same line segment in the second intermediate coordinate system is further obtained.

Figure 11:
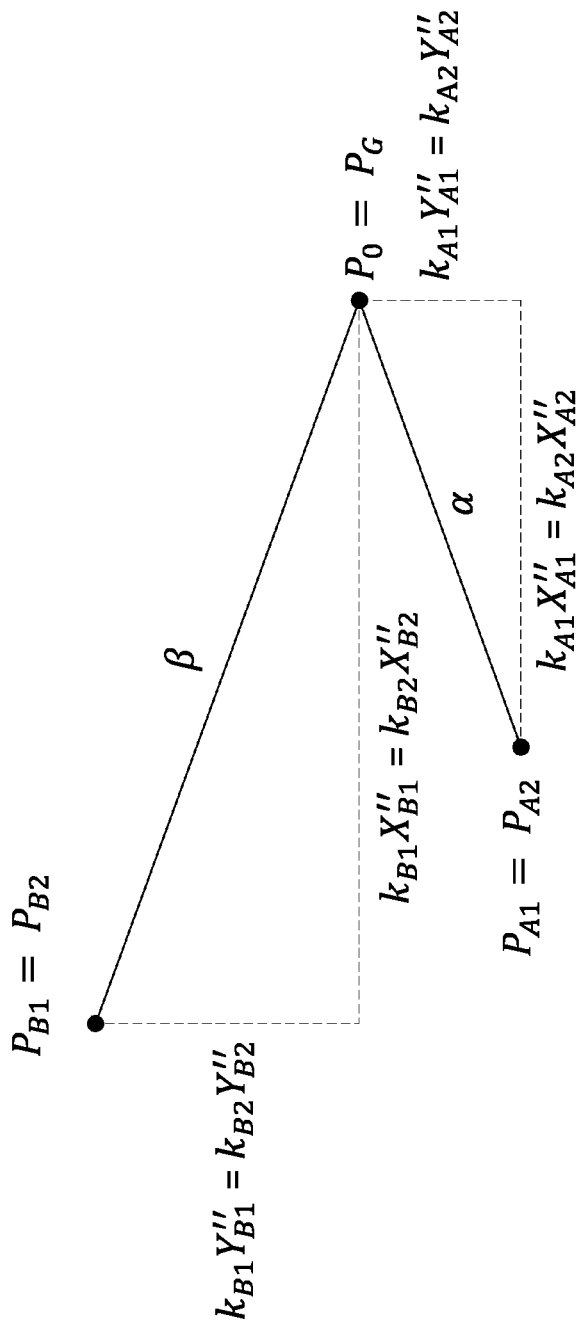
FIG. 11 is a schematic diagram illustrating the spatial coordinates of upper and lower endpoints of two vertical line segments from a top view according to an exemplary embodiment of the present disclosure.

FIG. 11 is a schematic diagram illustrating the spatial coordinates of upper and lower endpoints associated with two vertical line segments from a top view according to an exemplary embodiment of the present disclosure.

As shown in FIG. 11, from the perspective of the top view, for the vertical line segment $\overline{P_{A1}P_{A2}}$ and the vertical line segment $\overline{P_{B1}P_{B2}}$, the upper and lower endpoints of the same line segment overlap at one point. Therefore, when the image coordinates of the two projection endpoints of the same line segment are respectively transformed to the second intermediate coordinate system 230 (the direction of Z" axis of which is consistent with the direction of Z axis of the world coordinate system 210), the ratio of the X component and the Y component of the second intermediate coordinates of the two projection endpoints are the same. As such, for a line segment $\overline{P_{A1}P_{A2}}$:

$$\frac{X''_{A1}}{Y''_{A1}} = \frac{X''_{A2}}{Y''_{A2}}.$$

Based on equation (15) and equation (16):

$$\frac{s_{A1}\sin\theta_y}{u_{A1}\cos\theta_x - v_{A1}\sin\theta_x} = \frac{s_{A2}\sin\theta_y}{u_{A2}\cos\theta_x - v_{A2}\sin\theta_x}$$

Let:

$$k_A = \frac{s_{A2}}{s_{A1}} = \frac{u_{A2}\cos\theta_x - v_{A2}\sin\theta_x}{u_{A1}\cos\theta_x - v_{A1}\sin\theta_x}.$$

When using the right-handed coordinate system, the signs of $u_{A1}$ and $u_{A2}$ coefficients included in $k_A$ are corresponding adjusted to opposite numbers.

Substitute $k_A$ into equation (16), and get the following equation based on equation (15):

$$\begin{bmatrix} X''_{A2} \\ Y''_{A2} \\ Z''_{A2} \end{bmatrix} = \begin{bmatrix} k_A s_{A1}\sin\theta_y \\ k_A(u_{A1}\cos\theta_x - v_{A1}\sin\theta_x) \\ k_A\left(s_{A1}\cos\theta_y - \dfrac{r}{\cos\theta_y}\right) + (k_A - 1)\dfrac{r}{\cos\theta_y} \end{bmatrix} =$$

$$k_A \begin{bmatrix} X''_{A1} \\ Y''_{A1} \\ Z''_{A1} \end{bmatrix} + (k_A - 1)\begin{bmatrix} 0 \\ 0 \\ \dfrac{r}{\cos\theta_y} \end{bmatrix}.$$

Substitute the above equation into equation (10):

$$\alpha\left(\frac{Z''_{A1}}{\sqrt{X''^2_{A1} + Y''^2_{A1}}} - \frac{k_A Z''_{A1} + \dfrac{r(k_A - 1)}{\cos\theta_y}}{\sqrt{(k_A X''_{A1})^2 + (k_A Y''_{A1})^2}}\right) = \frac{\alpha r(1 - k_A)}{k_A \cos\theta_y \sqrt{X''^2_{A1} + Y''^2_{A1}}} = l_A.$$

And get:

$$\alpha = \frac{l_A k_A \cos\theta_y \sqrt{X''^2_{A1} + Y''^2_{A1}}}{r(1 - k_A)}. \quad (19)$$

Similarly, let:

$$k_B = \frac{s_{B2}}{s_{B1}} = \frac{u_{B2}\cos\theta_x - v_{B2}\sin\theta_x}{u_{B1}\cos\theta_x - v_{B1}\sin\theta_x}.$$

When using the right-handed coordinate system, the signs of $u_{B1}$ and $u_{B2}$ coefficients included in $k_B$ are corresponding adjusted to opposite numbers.

Substitute $k_B$ into equation (18), and get the following equation based on equation (17):

$$\begin{bmatrix} X''_{B2} \\ Y''_{B2} \\ Z''_{B2} \end{bmatrix} = k_B \begin{bmatrix} X''_{B1} \\ Y''_{B1} \\ Z''_{B1} \end{bmatrix} + (k_B - 1)\begin{bmatrix} 0 \\ 0 \\ \dfrac{r}{\cos\theta_y} \end{bmatrix}.$$

The above equation is substituted into equation (11) to get:

$$\beta = \frac{l_B k_B \cos\theta_y \sqrt{X''^2_{B1} + Y''^2_{B1}}}{r(1 - k_B)}. \quad (20)$$

Equation (19) and equation (20) are substituted into equation (12) to get:

$$\frac{l_A k_A Z''_{A1} \cos\theta_y}{r(1 - k_A)} - \frac{l_B k_B Z''_{B1} \cos\theta_y}{r(1 - k_B)} = h_{A1} - h_{B1}. \quad (21)$$

Based on equation (15) and equation (17):

$$Z_{A1}''\cos\theta_y = s_{A1}\cos^2\theta_y - r$$

$$Z_{B1}''\cos\theta_y = s_{B1}\cos^2\theta_y - r.$$

And substitute into equation (21) to get:

$$\frac{l_A k_A(s_{A1}\cos^2\theta_y - r)}{r(1-k_A)} - \frac{l_B k_B(s_{B1}\cos^2\theta_y - r)}{r(1-k_B)} = h_{A1} - h_{B1}$$

$$\cos^2\theta_y\left(\frac{l_A k_A s_{A1}}{r(1-k_A)} - \frac{l_B k_B s_{B1}}{r(1-k_B)}\right) = h_{A1} - h_{B1} + \frac{l_A k_A}{1-k_A} - \frac{l_B k_B}{1-k_B}.$$

Therefore get:

$$\cos^2\theta_y = \frac{h_{A1} - h_{B1} + \frac{l_A k_A}{1-k_A} - \frac{l_B k_B}{1-k_B}}{\frac{l_A k_A s_{A1}}{r(1-k_A)} - \frac{l_B k_B s_{B1}}{r(1-k_B)}} = \frac{r(h_{A1} - h_{B1} + t_A - t_B)}{t_A s_{A1} - t_B s_{B1}} \quad (22)$$

Wherein:

$$t_A = \frac{l_A k_A}{1-k_A}$$

$$t_B = \frac{l_B k_B}{1-k_B}.$$

When the camera is viewed at a depression angle ($\theta_y > 0$), the v coordinate corresponding to the intersection $p_C$ on the image plane is smaller than 0; on the contrary, when the camera is viewed at an elevation angle ($\theta_y < 0$), the v coordinate corresponding to the intersection $p_C$ on the image plane is greater than 0. Therefore, equation (6), equation (14) and equation (22) are combined to get:

$$\theta_y = \begin{cases} \theta_y^* & a_A > a_B \\ 0 & a_A = a_B \\ -\theta_y^* & a_A < a_B \end{cases} \quad (23)$$

Wherein:

$$\theta_y^* = \cos^{-1}\sqrt{\frac{r(h_{A1} - h_{B1} + t_A - t_B)}{t_A s_{A1} - t_B s_{B1}}}.$$

Referring to FIG. 6 again, in step S434, the focal length of the camera is calculated based on the second rotation angle of the camera and the intersection distance. In other words, based on rotation angle $\theta_y$ of Y axis of the camera and intersection distance r, the camera focal length f is calculated. Based on equation (13) to get:

$$f = r \tan \theta_y \quad (24).$$

Finally, in the last step S435 of the first stage, based on the first endpoint height, the second endpoint height, the first endpoint image coordinates and the second endpoint image coordinates corresponding to the first vertical line segment, the first rotation angle of the camera, the second rotation angle of the camera, and the intersection distance, the third translation vector element of the translation vector is calculated. In other words, based on the rotation angle $\theta_x$ of X axis of the camera, the rotation angle $\theta_y$ of Y axis of the camera, the heights of the upper and lower endpoints and the image coordinates of the upper and lower endpoints of any vertical line segment $\overline{P_{A1}P_{A2}}$ or $\overline{P_{B1}P_{B2}}$, Z coordinate value $t_z$ of the translation vector of the camera is calculated.

The $t_z$ of the translation vector of the camera is equal to the Z coordinate value $Z_0$ of the camera lens center point $P_0$ in the world coordinate system 210, as shown in FIG. 8, based on the relative location between the upper endpoint $P_{A1}$ of the line segment $\overline{P_{A1}P_{A2}}$ and $P_0$ to get:

$$h_{A1} = t_z + \alpha \frac{Z''_{A1}}{\sqrt{X''^2_{A1} + Y''^2_{A1}}}.$$

Based on equation (19) and equation (15), equation (25) is got:

$$t_z = \quad (25)$$

$$h_{A1} - \alpha \frac{Z''_{A1}}{\sqrt{X''^2_{A1} + Y''^2_{A1}}} = h_{A1} - \frac{l_A k_A \cos\theta_y \sqrt{X''^2_{A1} + Y''^2_{A1}}}{r(1-k_A)} \times \frac{Z''_{A1}}{\sqrt{X''^2_{A1} + Y''^2_{A1}}}$$

$$= h_{A1} - \frac{l_A k_A Z''_{A1} \cos\theta_y}{r(1-k_A)} = h_{A1} - \frac{l_A k_A(s_{A1}\cos^2\theta_y - r)}{r(1-k_A)}$$

$$= h_{A1} - t_A \frac{s_{A1}\cos^2\theta_y - r}{r} = h_{A1} + t_A\left(1 - \frac{s_{A1}\cos^2\theta_y}{r}\right)$$

In the first stage of the camera calibration method, the processing unit obtains the heights of the respective endpoints of the two vertical line segments and the image coordinates of the respective projection endpoints, and then calculates the focal length, the rotation angle of X axis (equivalent to the roll angle), and the rotation angle of Y axis (equivalent to the pitch angle) and the Z coordinate value of the translation vector of the camera.

Please refer back to FIG. 4, in step S440, the step of the second-stage camera calibration in the camera calibration method is described, and based on a reference direction of the space, the focal length, the first rotation angle and the second rotation angle of the camera, a third rotation angle of the camera is calculated. In other words, the camera calibration system 100 calculates the rotation angle $\theta_z$ of Z axis of the camera based on a reference direction, the focal length f, the rotation angle $\theta_x$ of X axis and the rotation angle $\theta_y$ of Y axis of the camera obtained in the first stage of the above-mentioned camera calibration method. The following process is based on the second intermediate coordinate system 230. Here, step S440 is the step of the second-stage camera calibration of the camera calibration method disclosed herein.

Figure 12:
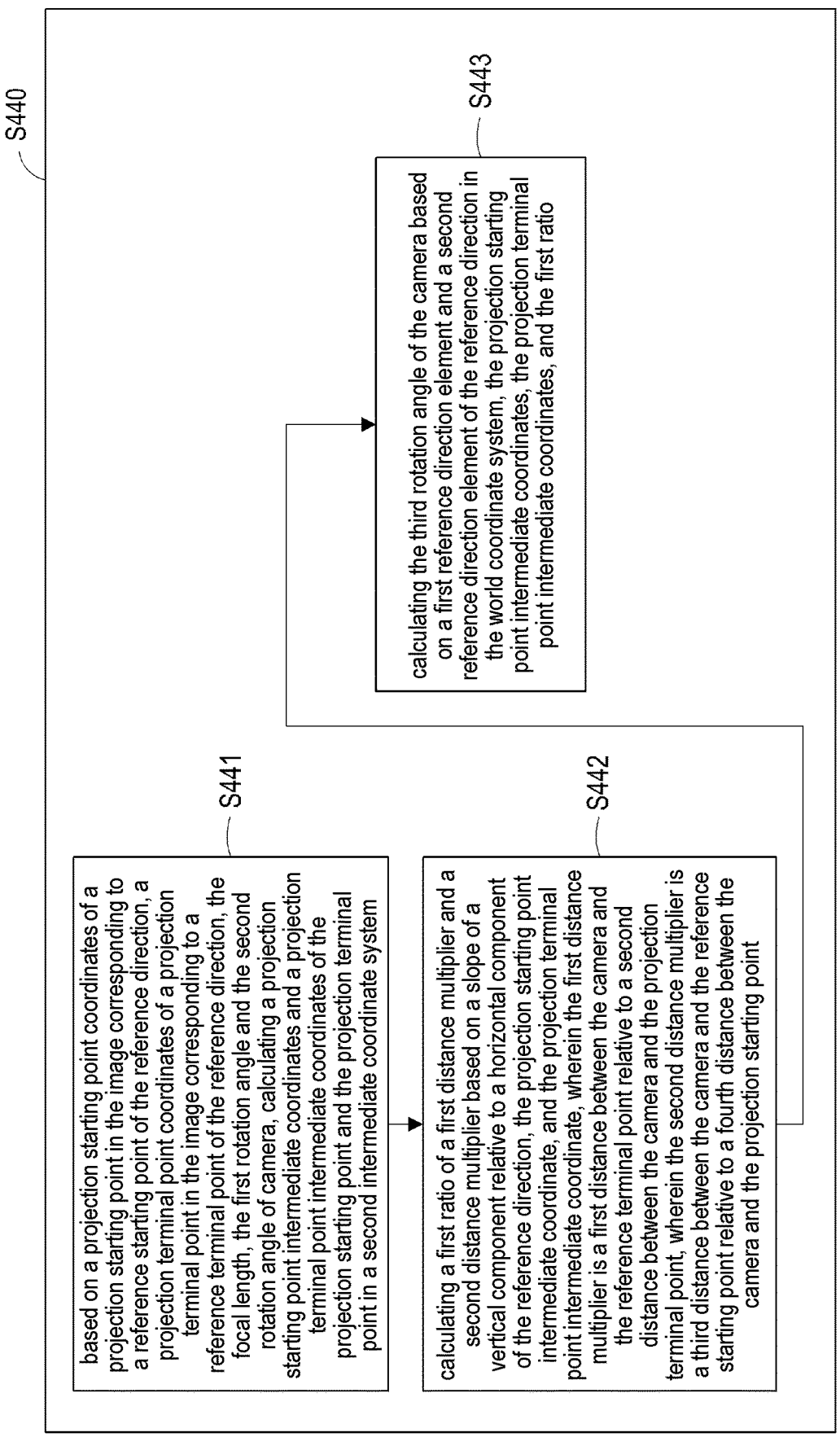
FIG. 12 is a flowchart of a second-stage camera calibration according to an exemplary embodiment of the present disclosure.

FIG. 12 is a flowchart of a second-stage camera calibration according to an exemplary embodiment of the present disclosure.

Please refer to FIG. 12, in step S441, based on a projection starting point coordinates of a projection starting point in the image corresponding to a reference starting point of the reference direction, a projection terminal point coordinates of a projection terminal point in the image corresponding to a reference terminal point of the reference direction, the focal length, the first rotation angle and the second rotation angle of the camera, a projection starting point intermediate coordinates and a projection terminal point intermediate coordinates of the projection starting point and the projection terminal point in a second intermediate coordinate system are calculated.

Figure 13:
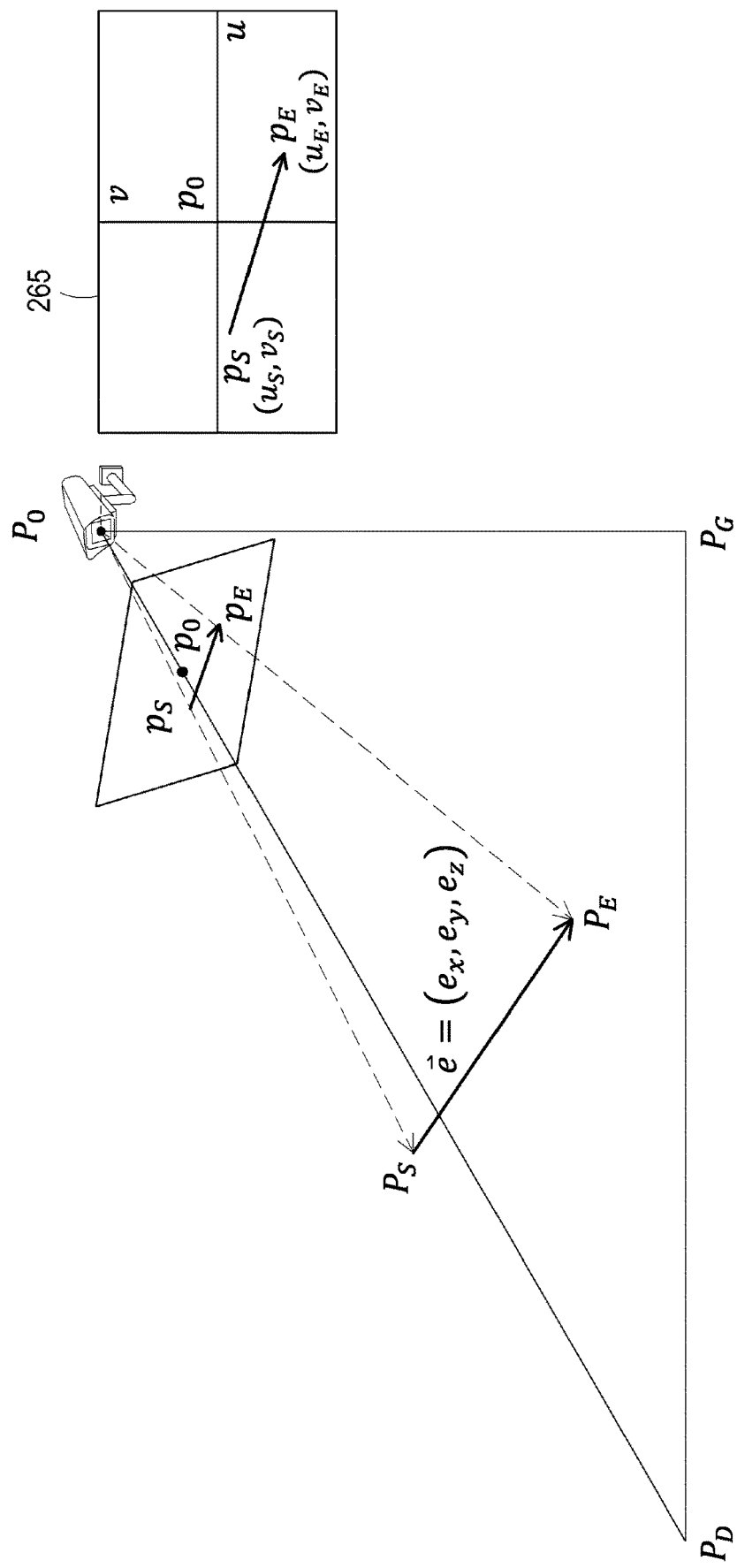
FIG. 13 is a schematic diagram of calculating a third rotation angle according to an exemplary embodiment of the present disclosure.

FIG. 13 is a schematic diagram of calculating a third rotation angle according to another exemplary embodiment of the present disclosure.

Please refer to FIG. 13, a reference direction $\vec{e} = (e_x, e_y, e_z)$ that is not perpendicular to the ground is given, the projection point coordinates in image plane of the starting point $P_S$ of the reference direction and the terminal point $P_E$ of the reference direction respectively are $p_S=(u_S, v_S)$ and $P_E=(u_E, v_E)$.

First, based on the image coordinates of the projection starting point $p_S$ and the projection terminal point $p_E$ corresponding to the starting point $P_S$ and the terminal point $P_E$ of the reference direction $\vec{e}$, the focal length f, the rotation angle $\theta_x$ of X axis and the rotation angle $\theta_y$ of Y axis of the camera, the coordinate values of the projection starting point $p_S$ and the projection terminal point $p_E$ in the second intermediate coordinate system 230 are calculated.

Based on equation (1), the image coordinates of the projection starting point $p_S$ on the image plane is transformed into the coordinates of the second intermediate coordinate system 230 as:

$$\begin{bmatrix} X_S'' \\ Y_S'' \\ Z_S'' \end{bmatrix} = \begin{bmatrix} f\cos\theta_y + u_S\sin\theta_x\sin\theta_y + v_S\cos\theta_x\sin\theta_y \\ u_S\cos\theta_x - v_S\sin\theta_x \\ -f\sin\theta_y + u_S\sin\theta_x\cos\theta_y + v_S\cos\theta_x\cos\theta_y \end{bmatrix}. \quad (26)$$

Therefore, based on the second intermediate coordinate system, the coordinates of the starting point $P_S$ of the reference direction is $(k_S X_S'', k_S Y_S'', k_S Z_S'')$, wherein $k_S$ is the distance multiplier of the starting point of the reference direction, $k_S>0$.

Similarly, the image coordinates of the projection terminal point $p_E$ on the image plane is transformed into the coordinates of the second intermediate coordinate system 230 as follows:

$$\begin{bmatrix} X_E'' \\ Y_E'' \\ Z_E'' \end{bmatrix} = \begin{bmatrix} f\cos\theta_y + u_E\sin\theta_x\sin\theta_y + v_E\cos\theta_x\sin\theta_y \\ u_E\cos\theta_x - v_E\sin\theta_x \\ -f\sin\theta_y + u_E\sin\theta_x\cos\theta_y + v_E\cos\theta_x\cos\theta_y \end{bmatrix}. \quad (27)$$

Therefore, based on the second intermediate coordinate system 230, the coordinates of the terminal point $P_E$ of the reference direction is $(k_E X_E'', k_E Y_E'', k_E Z_E'')$, wherein $k_E$ is the distance multiplier of the terminal point of the reference direction, $k_E>0$.

When the right-handed coordinate system is used, the signs of the $u_S$ and $u_E$ coefficients are corresponding adjusted to opposite numbers.

Next, in step S442, a first ratio of a first distance multiplier and a second distance multiplier is calculated based on a slope of a vertical component relative to a horizontal component of the reference direction, the projection starting point intermediate coordinates, and the projection terminal point intermediate coordinates, wherein the first distance multiplier is a first distance between the camera and the reference terminal point relative to a second distance between the camera and the projection terminal point, wherein the second distance multiplier is a third distance between the camera and the reference starting point relative to a fourth distance between the camera and the projection starting point. In other words, based on the slope of the vertical component relative to the horizontal component of the reference direction $\vec{e}$,, and the coordinate values of the projection starting point $p_S$ and projection terminal point $P_E$ in the second intermediate coordinate system 230, a ratio $k_Q$ of the distance multiplier $k_E$ of the terminal point of the reference direction (the distance multiplier of the distance between the camera lens center point $P_0$ and the terminal point $P_E$ of the reference direction $\vec{e}$ relative to the distance between the camera lens center point $P_0$ and the projection terminal point $p_E$) and the distance multiplier $k_S$ of the starting point of the reference direction (the distance multiplier of the distance between the camera lens center point $P_0$ and the starting point $P_S$ of the reference direction $\vec{e}$ relative to the distance between the camera lens center point $P_0$ and the projection starting point $p_S$) is calculated, which is defined as:

$$k_Q = \frac{k_E}{k_S}.$$

The following discusses the value of $k_Q$ based on whether the vertical component $e_z$ of the reference direction $\vec{e}$ is 0 or not:

In the first case, $e_z=0$.

The Z coordinate value of the starting point $P_S$ of the reference direction $\vec{e}$ is the same as the Z coordinate value of the terminal point $P_E$ of the reference direction $\vec{e}$ in the second intermediate coordinate system 230, so $$k_S Z_S'' = k_E Z_E''.$$

And equation (28) is got:

$$k_Q = \frac{Z_S''}{Z_E''}. \quad (28)$$

In the second case, $e_z \neq 0$.

Figure 14:
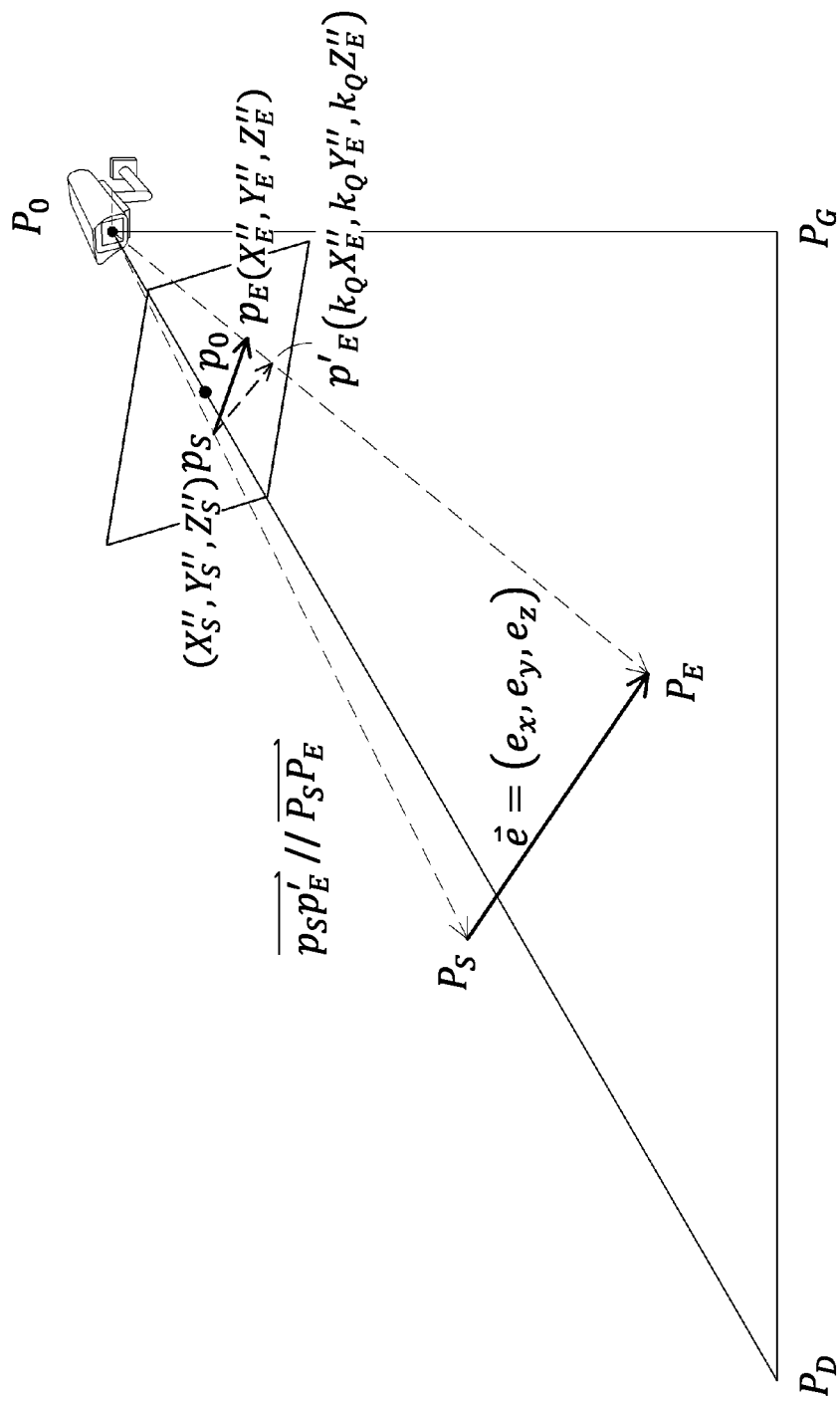
FIG. 14 is a detailed schematic diagram of calculating the third rotation angle in FIG. 13.

FIG. 14 is a detailed schematic diagram of calculating the third rotation angle in FIG. 13.

Please refer to FIG. 14, the direction of $\overrightarrow{P_S P_E}$ and the reference direction $\vec{e}$ are the same directions described by the second intermediate coordinate system 230 and the world coordinate system 210 respectively, and therefore, the slope of the vertical component relative to the horizontal component of the $\overrightarrow{P_S P_E}$ is the same as the slope of the vertical component relative to the horizontal component of the reference direction $\vec{e}$::

$$\frac{k_E Z_E'' - k_S Z_S''}{\sqrt{(k_E X_E'' - k_S X_S'')^2 + (k_E Y_E'' - Y_S'')^2}} = \frac{e_z}{\sqrt{e_x^2 + e_y^2}}. \quad (29)$$

That is, $$\frac{k_Q Z_E'' - k_S Z_S''}{\sqrt{(k_Q X_E'' - X_S'')^2 + (k_Q Y_E'' - Y_S'')^2}} = r_z$$

Wherein $$r_z = \frac{e_z}{\sqrt{e_x^2 + e_y^2}}.$$

Binomial of $k_Q$ is organized as:

$(r_z^2 X_E''^2 + r_z^2 Y_E''^2 - Z_E''^2)k_Q^2 - 2(r_z^2 X_S'' X_E'' + r_z^2 Y_S'' Y_E'' - Z_S'' Z_E'')k_Q + (r_z^2 X_S''^2 + r_z^2 Y_S''^2 - Z_S''^2) = 0.$

And equation (30) is got:

$$k_Q = \frac{A \pm \sqrt{(r_z^2 X_S'' X_E'' + r_z^2 Y_S'' Y_E'' - Z_S'' Z_E'')^2 - (r_z^2 X_E''^2 + r_z^2 Y_E''^2 - Z_E''^2)(r_z^2 X_S''^2 + r_z^2 Y_S''^2 - Z_S''^2)}}{r_z^2 X_E''^2 + r_z^2 Y_E''^2 - Z_E''^2}$$

$$= \frac{A \pm \sqrt{(r_z X_S'' Z_E'' - r_z X_E'' Z_S'')^2 + (r_z Y_S'' Z_E'' - r_z Y_E'' Z_S'')^2 - (r_z^2 X_S'' Y_E'' - r_z^2 X_E'' Y_S'')^2}}{r_z^2 X_E''^2 + r_z^2 Y_E''^2 - Z_E''^2}$$

$$= \frac{A \pm r_z \sqrt{(X_S'' Z_E'' - X_E'' Z_S'')^2 + (Y_S'' Z_E'' - Y_E'' Z_S'')^2 - r_z^2 (X_S'' Y_E'' - X_E'' Y_S'')^2}}{r_z^2 X_E''^2 + r_z^2 Y_E''^2 - Z_E''^2}$$

Wherein, $A = r_z^2 X_S'' X_E'' + r_z^2 Y_S'' Y_E'' - Z_S'' Z_E''$.

The correct $k_Q$ can be obtained by removing the extraneous root according to equation (29).

It should be noted that $k_Q$ represents the scaling ratio of the distance from the camera lens center point $P_0$ to the projection terminal point $p_E$. As shown in FIG. 14, when the projection terminal point $p_E$ moves to $p_E'$ based on the scaling ratio $k_Q$, although the direction values indicated by the direction of $\overrightarrow{p_S p_E'}$ and the reference direction $\vec{e}$ are different, in essence, the direction of $\overrightarrow{p_S p_E'}$ and the reference direction $\vec{e}$ are two directions parallel to each other in three-dimensional space. In fact, the direction of $\overrightarrow{p_S p_E'}$ and the reference direction $\vec{e}$ are two parallel directions described by the second intermediate coordinate system 230 and the world coordinate system 210 respectively.

Finally, in step S443, the third rotation angle of the camera is calculated based on a first reference direction element and a second reference direction element of the reference direction in the world coordinate system, the projection starting point intermediate coordinates, the projection terminal point intermediate coordinates, and the first ratio. In other words, based on the X and Y coordinate values of the reference direction $\vec{e}$ in the world coordinate system 210, the X" and Y" coordinate values of the projection starting point $p_S$ and the projection terminal point $p_E$ in the second intermediate coordinate system 210, and the ratio $k_Q$, the rotation angle $\theta_z$ of Z axis of the camera is calculated.

In the world coordinate system 210, the projection direction formed by the projection of the reference direction $\vec{e}$ on the XY plane is:

$$\vec{e}^* = (e_x, e_y).$$

In the second intermediate coordinate system 230, the intermediate projection vector $\overrightarrow{P_{S^*}'' P_{E^*}''}$ formed by the projection of the vector $\overrightarrow{P_S P_E}$ on the X"Y" plane is:

$$\overrightarrow{P_{S^*}'' P_{E^*}''} = (k_E X_E'' - k_S X_S'', k_E Y_E'' - k_S Y_S'') = (k_S (k_Q X_E'' - X_S''), k_S (k_Q Y_E'' - Y_S'')).$$

$\theta_z$ is equivalent to the rotation angle from the direction of $\overrightarrow{P_{S^*}'' P_{E^*}''}$ to the direction of $\vec{e}^*$, and the cosine value of the rotation angle is:

$$\cos \theta_z = \frac{\vec{e}^* \cdot \overrightarrow{P_{S^*}'' P_{E^*}''}}{|\vec{r}^*| \cdot |\overrightarrow{P_{S^*}'' P_{E}''}|} = \frac{e_x k_S (k_Q X_E'' - X_S'') + e_y k_S (k_Q Y_E'' - Y_S'')}{\sqrt{e_x^2 + e_y^2} \sqrt{(k_S (k_Q X_E'' - X_S''))^2 + (k_S (k_Q Y_E'' - Y_S''))^2}}$$

$$= \frac{e_x (k_Q X_E'' - X_S'') + e_y (k_Q Y_E'' - Y_S'')}{\sqrt{e_x^2 + e_y^2} \sqrt{(k_Q X_E'' - X_S'')^2 + (k_Q Y_E'' - Y_S'')^2}}.$$

And thus equation (31) is got:

$$\theta_z = \begin{cases} \theta_z^* & e_x(k_Q Y_E'' - Y_S'') - e_y(k_Q X_E'' - X_S'') \leq 0 \\ -\theta_z^* & e_x(k_Q Y_E'' - Y_S'') - e_y(k_Q X_E'' - X_S'') > 0 \end{cases}. \quad (31)$$

Wherein:

$$\theta_z^* = \cos^{-1} \frac{e_x(k_Q X_E'' - X_S'') + e_y(k_Q Y_E'' - Y_S'')}{\sqrt{e_x^2 + e_y^2} \sqrt{(k_Q X_E'' - X_S'')^2 + (k_Q Y_E'' - Y_S'')^2}}.$$

When $\vec{e} = (1,0,0)$, $\theta_z$ can be simplified as:

$$\theta_z = \begin{cases} \theta_z^* & k_Q Y_E'' - Y_S'' \leq 0 \\ -\theta_z^* & k_Q Y_E'' - Y_S'' > 0 \end{cases}.$$

Wherein:

$$\theta_z^* = \cos^{-1} \frac{k_Q X_E'' - X_S''}{\sqrt{(k_Q X_E'' - X_S'')^2 + (k_Q Y_E'' - Y_S'')^2}}.$$

Similarly, when $\vec{e} = (0,1,0)$, $\theta_z$ can be simplified as:

$$\theta_z = \begin{cases} \theta_z^* & k_Q X_E'' - X_S'' \geq 0 \\ -\theta_z^* & k_Q X_E'' - X_S'' < 0 \end{cases}.$$

Wherein:

$$\theta_z^* = \cos^{-1} \frac{k_Q Y_E'' - Y_S''}{\sqrt{(k_Q X_E'' - X_S'')^2 + (k_Q Y_E'' - Y_S'')^2}}.$$

It should be noted that the reference direction $\vec{e}$ can be the direction formed by connecting one endpoint ($P_{A1}$ Or $P_{A2}$) of the upper and lower endpoints of the line segment $\overline{P_{A1} P_{A2}}$ and one endpoint ($P_{B1}$ Or $P_{B2}$) of the upper and lower endpoints of the line segment $\overline{P_{B1} P_{B2}}$, and can also be any direction that is not perpendicular to the ground and independent of the upper and lower endpoints of the line segment $\overline{P_{A1} P_{A2}}$ and the line segment $\overline{P_{B1} P_{B2}}$. At the same time, in this stage (the second stage of the camera calibration method), the reference direction $\vec{e} = (e_x, e_y, e_z)$ used to calculate the rotation angle $\theta_z$ of Z axis of the camera is captured by only a direction in the world coordinate system 210, for example, the ratio between the three components of the said direction in the directions of XYZ axis, or the unit vector of the said direction, without obtaining the spatial coordinates of the starting point $P_S$ and the terminal point $P_E$ of the reference direction, and without obtaining the space distance between the starting point $P_S$ and the terminal point $P_E$.

Please refer back to FIG. 4 again, in step S450, based on a reference point of the space, the focal length, the first rotation angle, the second rotation angle, the third rotation angle and the third translation vector element of the translation vector of the camera, a first translation vector element and a second translation vector element of the translation vector of the camera is calculated. Here, step S450 is the step of the third-stage camera calibration of the camera calibration method disclosed herein.

Figure 15:
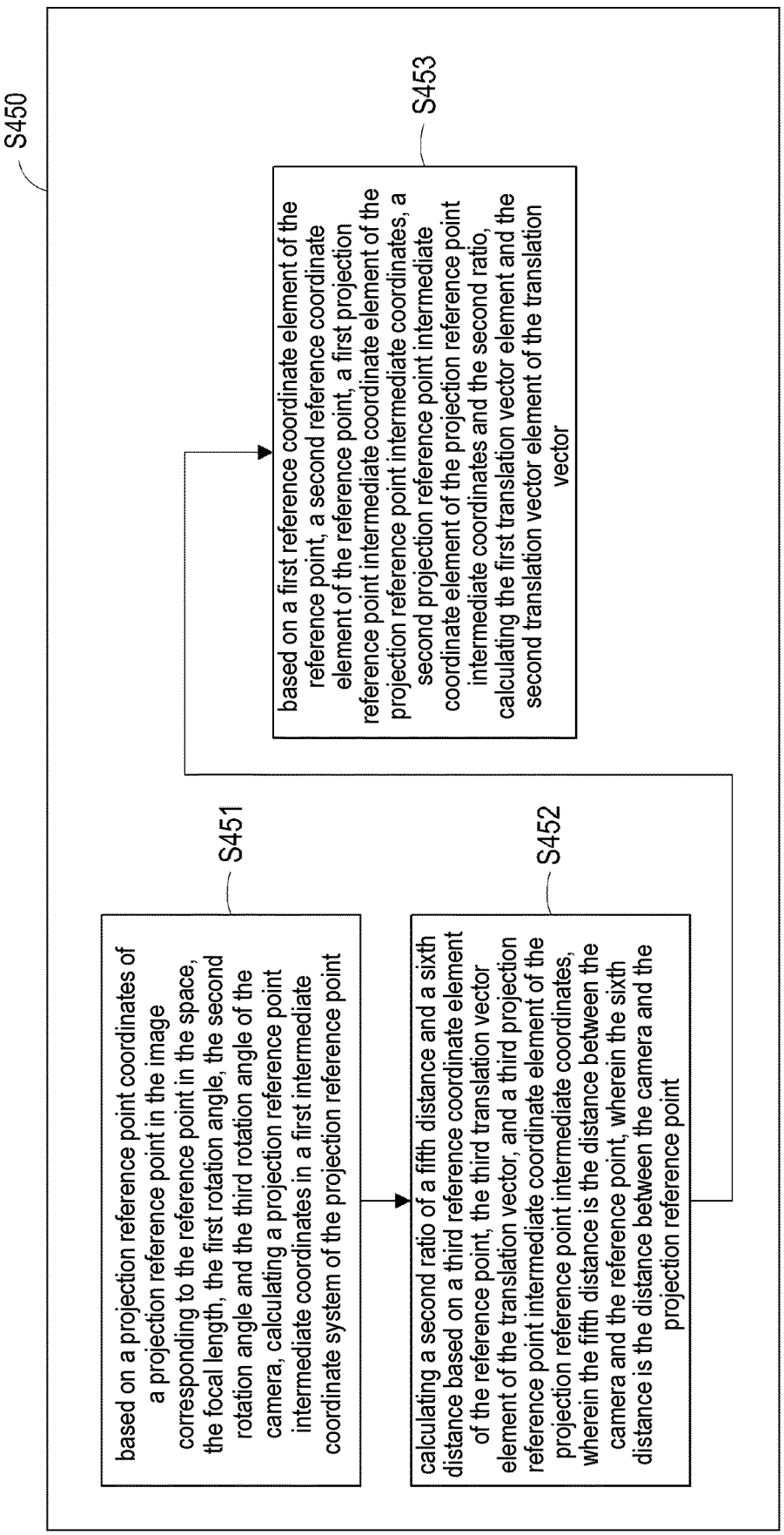
FIG. 15 is a flowchart of a third-stage camera calibration according to an exemplary embodiment of the present disclosure.

FIG. 15 is a flowchart of a third-stage camera calibration according to an exemplary embodiment of the present disclosure. And FIG. 16 is a schematic diagram of calculating a translation vector according to an exemplary embodiment of the present disclosure.

Figure 16:
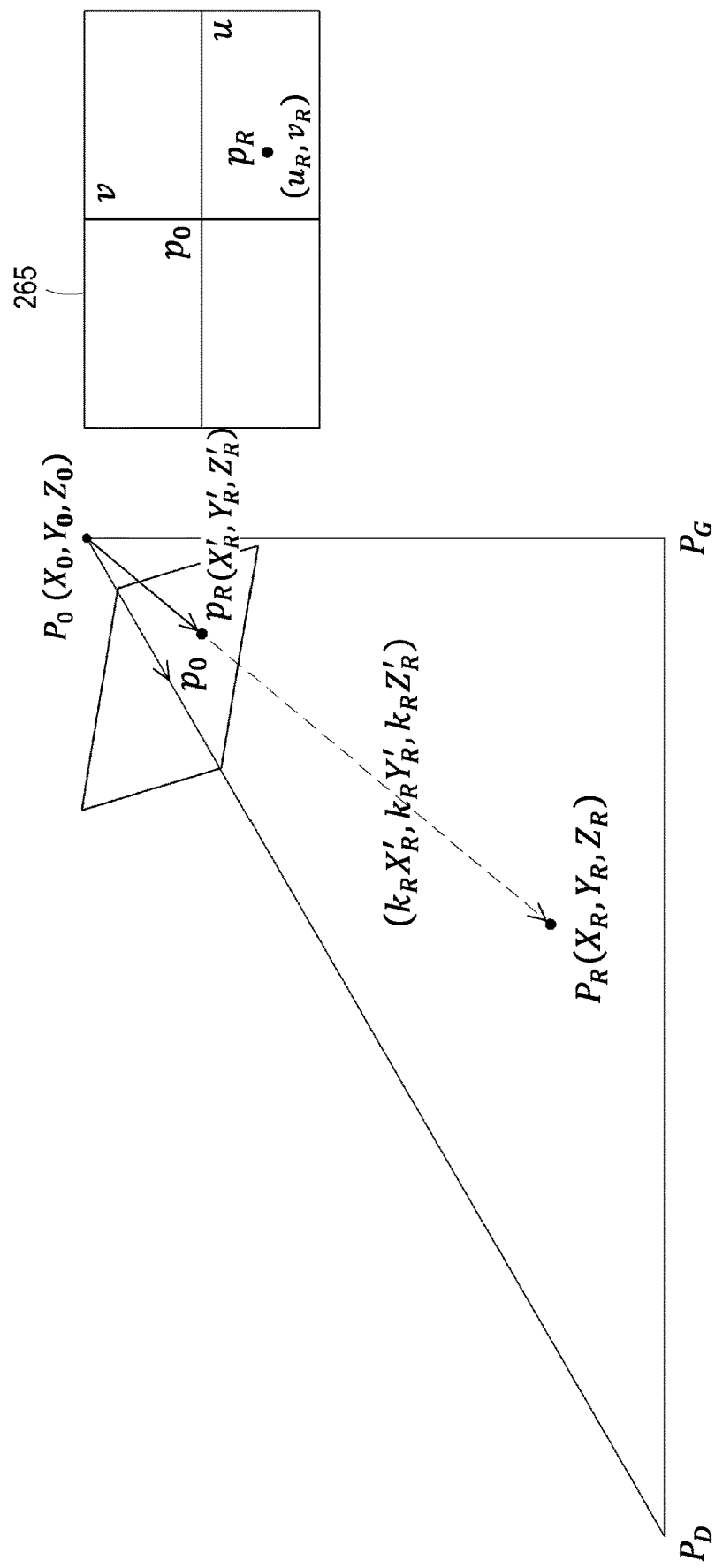
FIG. 16 is a schematic diagram of calculating a translation vector according to an exemplary embodiment of the present disclosure.

Please refer to FIG. 15 and FIG. 16, a reference point $P_R$ and the focal length f, the rotation angles $\theta_x$, $\theta_y$, and $\theta_z$ of XYZ axis, and the Z coordinate value $t_z$ of the translation vector of the camera are given, and then the X coordinate value $t_x$ and Y coordinate value $t_y$ of the translation vector of the camera are calculated. The said calculation process is based on the first intermediate coordinate system 220. In step S451, based on a projection reference point coordinates of a projection reference point in the image corresponding to the reference point in the space, the focal length, the first rotation angle, the second rotation angle and the third rotation angle of the camera, a projection reference point intermediate coordinates in a first intermediate coordinate system of the projection reference point is calculated. That is, a reference point $P_R$ is given in a space, assume the world coordinates of the reference point $P_R$ is $(X_R, Y_R, Z_R)$, and the image coordinates of the projection reference point $p_R$ on the image plane 265 corresponding to the reference point $P_R$ is $(u_R, v_R)$.

In this stage, first, based on the image coordinates $(u_R, v_R)$ of the projection reference point $p_R$ corresponding to the reference point $P_R$, the focal length f, and the rotation angles $\theta_x$, $\theta_y$ and $\theta_z$ of XYZ axis of the camera, the coordinate values of the projection reference point $p_R$ in the first intermediate coordinate system 220 is calculated.

Based on equation (2), the image coordinates $(u_R, v_R)$ of the projection reference point $p_R$ on the image plane is transformed into the coordinates of the first intermediate coordinate system 220 as:

$$\begin{bmatrix} X'_R \\ Y'_R \\ Z'_R \end{bmatrix} = \begin{bmatrix} fB + u_R(D\cos\theta_z - \cos\theta_x\sin\theta_z) + v_R(E\cos\theta_z + \sin\theta_x\sin\theta_z) \\ fC + u_R(D\sin\theta_z + \cos\theta_x\cos\theta_z) + v_R(E\sin\theta_z - \sin\theta_x\cos\theta_z) \\ -f\sin\theta_y + u_R\sin\theta_x\cos\theta_y + v_R\cos\theta_x + \cos\theta_y \end{bmatrix} \quad (32)$$

wherein, $B = \cos\theta_y\cos\theta_z$, $C = \cos\theta_y\sin\theta_z$, $D = \sin\theta_x\sin\theta_y$, $E = \cos\theta_x\sin\theta_y$.

When using the right-handed coordinate system, the signs of the $u_R$ coefficient are corresponding adjusted to opposite numbers.

Therefore, based on the first intermediate coordinate system 220, the coordinates of $P_R$ is $(k_R X'_R, k_R Y'_R, k_R Z'_R)$, wherein $k_R$ is the distance multiplier of the reference point, $k_R > 0$.

Next, in step S452, based on a third reference coordinate element of the reference point, the third translation vector element of the translation vector, and a third projection reference point intermediate coordinate element of the projection reference point intermediate coordinates, a second ratio of a fifth distance and a sixth distance is calculated, wherein the fifth distance is the distance between the camera and the reference point, wherein the sixth distance is the distance between the camera and the projection reference point. In other words, based on the Z coordinate value $Z_R$ of the reference point $P_R$, the Z coordinate value $t_z$ of the camera translation vector, and the Z coordinate value $Z_R'$ of the projection reference point $p_R$ in the first intermediate coordinate system 220, the ratio $k_R$ of the distance between the camera lens center point $P_0$ and the reference point $P_R$ to the distance between the camera lens center point $P_0$ and the projection reference point $p_R$ is calculated.

The $t_x$, $t_y$ and $t_z$ of the translation vector are respectively equal to the X coordinate value $X_0$, Y coordinate value $Y_0$ and Z coordinate value $Z_0$ of the camera lens center point $P_0$ in the world coordinate system, as shown in FIG. 16, the coordinate values of $P_R$ in the first intermediate coordinate system 220 obtained by transforming from the image coordinates of the projection reference point $p_R$ is the same as that obtained by transforming from the world coordinates of the reference point $P_R$. As such, the following equation is got:

$$\begin{bmatrix} X_R \\ Y_R \\ Z_R \end{bmatrix} - \begin{bmatrix} t_x \\ t_y \\ t_z \end{bmatrix} = k_R \begin{bmatrix} X'_R \\ Y'_R \\ Z'_R \end{bmatrix}.$$

Based on the equation of the Z coordinate value of $P_R$ in the first intermediate coordinate system 220, equation (33) is got:

$$k_R = \frac{Z_R - t_z}{Z'_R}. \quad (33)$$

Finally, in step S453, based on a first reference coordinate element of the reference point, a second reference coordinate element of the reference point, a first projection reference point intermediate coordinate element of the projection reference point intermediate coordinates, a second projection reference point intermediate coordinate element of the projection reference point intermediate coordinates and the second ratio, the first translation vector element and the second translation vector element of the translation vector are calculated. In other words, based on the X coordinate value $X_R$ and the Y coordinate value $Y_R$ of the reference point $P_R$, the X coordinate value $X_R'$ and the Y coordinate value $Y_R'$ of the projection reference point $p_R$ in the first intermediate coordinate system 220, and the ratio $k_R$, $t_x$ and $t_y$ of the translation vector are calculated.

Based on the X coordinate value of $P_R$ in the first intermediate coordinate system 220, equation (34) is got:

$$t_x = X_R - k_R X'_R \quad (34).$$

Based on the Y coordinate value of $P_R$ in the first intermediate coordinate system 220, equation (35) is got:

$$t_y = Y_R - k_R Y_R' \qquad (35).$$

It is worth noting that the reference point $P_R$ can be the upper endpoint $P_{A1}$ or the lower endpoint $P_{A2}$ of the line segment $\overline{P_{A1}P_{A2}}$, or be the upper endpoint $P_{B1}$ or lower endpoint $P_{B2}$ of the line segment $\overline{P_{B1}P_{B2}}$, or be independent of the line segment $\overline{P_{A1}P_{A2}}$ and the line segment $\overline{P_{B1}P_{B2}}$. This disclosure does not limit the selection of the reference point.

In the third stage of the camera calibration method, a reference point $P_R$, the focal length f, the rotation angles $\theta_x$, $\theta_y$ and $\theta_z$ of XYZ axis and the Z coordinate value $t_z$ of the translation vector of the camera are given, and the X coordinate value $t_x$ and Y coordinate value $t_y$ of the translation vector of the camera are calculated through the first intermediate coordinate system 220.

The camera calibration parameters obtained through the above three stages of the present disclosure can be applied to the camera image, and the coordinate values of the camera image are transformed into coordinate values of the world coordinate system.

To sum up, this disclosure can obtain the coordinate transformation templates (or coordinate transformation equations) of each point between the world coordinate system and the image coordinate system only through two different vertical line segments with known information, one reference direction, and one reference point in the world coordinate system without limiting to the selection of the position of the vertical line segment, nor the pattern of the space environment. In this way, a camera calibration method with high precision is provided that is simple and fast in on-site operations, low skill specialized, and applicable in general fields, so as to reduce the construction cost and difficulty of camera calibration.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A camera calibration method, comprising:
   setting up a camera in a space;
   selecting or establishing a first vertical line segment and a second vertical line segment in the space, wherein the first vertical line segment includes a first endpoint and a second endpoint, and the second vertical line segment includes a third endpoint and a fourth endpoint;
   capturing an image including the first vertical line segment and the second vertical line segment in the space by the camera;
   obtaining a first endpoint height of the first endpoint, a second endpoint height of the second endpoint, a third endpoint height of the third endpoint and a fourth endpoint height of the fourth endpoint;
   obtaining a first endpoint image coordinates corresponding to the first endpoint and a second endpoint image coordinates corresponding to the second endpoint in the image;
   obtaining a third endpoint image coordinates corresponding to the third endpoint and a fourth endpoint image coordinates corresponding to the fourth endpoint in the image;
   based on the first endpoint image coordinates and the first endpoint height, the second endpoint image coordinates and the second endpoint height, the third endpoint image coordinates and the third endpoint height, and the fourth endpoint image coordinates and the fourth endpoint height, calculating a focal length, a first rotation angle, a second rotation angle and a third translation vector element of a translation vector of the camera;
   calculating a third rotation angle of the camera based on a reference direction of the space, the focal length, the first rotation angle and the second rotation angle of the camera; and
   calculating a first translation vector element and a second translation vector element of the translation vector of the camera based on a reference point of the space, the focal length, the first rotation angle, the second rotation angle, the third rotation angle, and the third translation vector element of the translation vector of the camera.

2. The camera calibration method as claimed in claim 1, wherein the step of calculating the focal length, the first rotation angle, the second rotation angle and the third translation vector element of the translation vector of the camera based on the first endpoint image coordinates and the first endpoint height, the second endpoint image coordinates and the second endpoint height, the third endpoint image coordinates and the third endpoint height, and the fourth endpoint image coordinates and the fourth endpoint height, further includes:
   calculating an intersection coordinates of an intersection formed by extending a first projection line segment in the image corresponding to the first vertical line segment and extending a second projection line segment in the image corresponding to the second vertical line segment; and
   calculating the first rotation angle of the camera based on the intersection coordinates.

3. The camera calibration method as claimed in claim 2, further comprising:
   calculating an intersection distance between the intersection and an image origin of the image based on the intersection coordinates.

4. The camera calibration method as claimed in claim 3, further comprising:
   based on the intersection distance, the first rotation angle of the camera, the first endpoint image coordinates and the first endpoint height, the second endpoint image coordinates and the second endpoint height, the third endpoint image coordinates and the third endpoint height, and the fourth endpoint image coordinates and the fourth endpoint height, calculating the second rotation angle of the camera.

5. The camera calibration method as claimed in claim 3, further comprising:
   calculating the focal length of the camera based on the second rotation angle of the camera and the intersection distance.

6. The camera calibration method as claimed in claim 3, further comprising:
   based on the first endpoint height, the second endpoint height, the first endpoint image coordinates and the second endpoint image coordinates corresponding to the first vertical line segment, the first rotation angle of the camera, the second rotation angle of the camera and the intersection distance, calculating the third translation vector element of the translation vector.

7. The camera calibration method as claimed in claim 1, wherein the step of calculating the third rotation angle of the camera based on the reference direction of the space, the focal length, the first rotation angle and the second rotation angle of the camera further includes:

based on a projection starting point coordinates of a projection starting point in the image corresponding to a reference starting point of the reference direction, a projection terminal point coordinates of a projection terminal point in the image corresponding to a reference terminal point of the reference direction, the focal length, the first rotation angle and the second rotation angle of camera, calculating a projection starting point intermediate coordinates and a projection terminal point intermediate coordinates of the projection starting point and the projection terminal point in a second intermediate coordinate system.

8. The camera calibration method as claimed in claim 7, further comprising:

calculating a first ratio of a first distance multiplier and a second distance multiplier based on a slope of a vertical component relative to a horizontal component of the reference direction, the projection starting point intermediate coordinates, and the projection terminal point intermediate coordinates, wherein the first distance multiplier is a first distance between the camera and the reference terminal point relative to a second distance between the camera and the projection terminal point, wherein the second distance multiplier is a third distance between the camera and the reference starting point relative to a fourth distance between the camera and the projection starting point.

9. The camera calibration method as claimed in claim 8, further comprising:

calculating the third rotation angle of the camera based on a first reference direction element and a second reference direction element of the reference direction in a world coordinate system, the projection starting point intermediate coordinates, the projection terminal point intermediate coordinates, and the first ratio.

10. The camera calibration method as claimed in claim 1, wherein the step of calculating the first translation vector element and the second translation vector element of the translation vector of the camera based on a reference point of the space, the focal length, the first rotation angle, the second rotation angle, the third rotation angle and the third translation vector element of the translation vector of the camera further includes:

based on a projection reference point coordinates of a projection reference point in the image corresponding to the reference point in the space, the focal length, the first rotation angle, the second rotation angle and the third rotation angle of the camera, calculating a projection reference point intermediate coordinates in a first intermediate coordinate system of the projection reference point.

11. The camera calibration method as claimed in claim 10, further comprising:

calculating a second ratio of a fifth distance and a sixth distance based on a third reference coordinate element of the reference point, the third translation vector element of the translation vector, and a third projection reference point intermediate coordinate element of the projection reference point intermediate coordinates, wherein the fifth distance is the distance between the camera and the reference point, wherein the sixth distance is the distance between the camera and the projection reference point.

12. The camera calibration method as claimed in claim 11, further comprising:

based on a first reference coordinate element of the reference point, a second reference coordinate element of the reference point, a first projection reference point intermediate coordinate element of the projection reference point intermediate coordinates, a second projection reference point intermediate coordinate element of the projection reference point intermediate coordinates and the second ratio, calculating the first translation vector element and the second translation vector element of the translation vector.

13. A camera calibration system, comprising:

a camera installed in a space, wherein the camera captures an image of the space and the space establishes a first vertical line segment and a second vertical line segment, wherein the first vertical line segment includes a first endpoint and a second endpoint, and the second vertical line segment includes a third endpoint and a fourth endpoint;

a storage unit, storing a first endpoint height of the first endpoint, a second endpoint height of the second endpoint, a third endpoint height of the third endpoint, a fourth endpoint height of the fourth endpoint, a first endpoint image coordinates corresponding to the first endpoint in the image, a second endpoint image coordinates corresponding to the second endpoint in the image, a third endpoint image coordinates corresponding to the third endpoint in the image and a fourth endpoint image coordinates corresponding to the fourth endpoint in the image; and a processing unit connected to the camera and the storage unit, wherein the processing unit is configured to perform:

the process of calculating a focal length, a first rotation angle, a second rotation angle and a third translation vector element of a translation vector of the camera based on the first endpoint image coordinates and the first endpoint height, the second endpoint image coordinates and the second endpoint height, the third endpoint image coordinates and the third endpoint height, and the fourth endpoint image coordinates and the fourth endpoint height;

the process of calculating a third rotation angle of the camera based on a reference direction of the space, the focal length, the first rotation angle and the second rotation angle of the camera;

the process of calculating a first translation vector element and a second translation vector element of the translation vector of the camera based on a reference point of the space, the focal length, the first rotation angle, the second rotation angle, the third rotation angle, and the third translation vector element of the translation vector of the camera.

14. The camera calibration system as claimed in claim 13, wherein in the process of calculating the focal length, the first rotation angle, the second rotation angle and the third translation vector element of the translation vector of the camera based on the first endpoint image coordinates and the first endpoint height, the second endpoint image coordinates and the second endpoint height, the third endpoint image coordinates and the third endpoint height, and the fourth endpoint image coordinates and the fourth endpoint height, the processing unit is further configured to perform:

an operation of calculating an intersection coordinates of an intersection formed by extending a first projection line segment in the image corresponding to the first vertical line segment and extending a second projection line segment in the image corresponding to the second vertical line segment;

an operation of calculating the first rotation angle of the camera based on the intersection coordinates; and an operation of calculating an intersection distance between the intersection and an image origin of the image based on the intersection coordinates.

15. The camera calibration system as claimed in claim 14, wherein the processing unit is further configured to perform:

an operation of calculating the second rotation angle of the camera based on the intersection distance, the first rotation angle of the camera, the first endpoint image coordinates and the first endpoint height, the second endpoint image coordinates and the second endpoint height, and the third endpoint image coordinates and the third endpoint height, and the fourth endpoint image coordinates and the fourth endpoint height; and an operation of calculating the focal length of the camera based on the second rotation angle of the camera and the intersection distance.

16. The camera calibration system as claimed in claim 14, wherein the processing unit is further configured to perform:

an operation of calculating the third translation vector element of the translation vector based on the first endpoint height, the second endpoint height, the first endpoint image coordinates and the second endpoint image coordinates corresponding to the first vertical line segment, the first rotation angle of the camera, the second rotation angle of the camera and the intersection distance.

17. The camera calibration system as claimed in claim 13, wherein in the operation of calculating the third rotation angle of the camera based on the reference direction of the space, the focal length, the first rotation angle and the second rotation angle of the camera, the processing unit is further configured to perform:

an operation of calculating a projection starting point intermediate coordinates and a projection terminal point intermediate coordinates of the projection starting point and the projection terminal point in a second intermediate coordinate system based on a projection starting point coordinates of a projection starting point in the image corresponding to a reference starting point of the reference direction, a projection terminal point coordinates of a projection terminal point in the image corresponding to a reference terminal point of the reference direction, the focal length, the first rotation angle and the second rotation angle of the camera.

18. The camera calibration system as claimed in claim 17, wherein the processing unit is further configured to perform:

an operation of calculating a first ratio of a first distance multiplier and a second distance multiplier based on a slope of a vertical component relative to a horizontal component of the reference direction, the projection starting point intermediate coordinates, and the projection terminal point intermediate coordinates, an operation of calculating the third rotation angle of the camera based on a first reference direction element and a second reference direction element of the reference direction in a world coordinate system, the projection starting point intermediate coordinates, the projection terminal point intermediate coordinates, and the first ratio, wherein the first distance multiplier is a first distance between the camera and the reference terminal point relative to a second distance between the camera and the projection terminal point, wherein the second distance multiplier is a third distance between the camera and the reference starting point relative to a fourth distance between the camera and the projection starting point.

19. The camera calibration system as claimed in claim 13, wherein in the operation of calculating the first translation vector element and the second translation vector element of the translation vector of the camera based on a reference point of the space, the focal length, the first rotation angle, the second rotation angle, the third rotation angle and the third translation vector element of the translation vector of the camera, the processing unit is further configured to perform:

an operation of based on a projection reference point coordinates of a projection reference point in the image corresponding to the reference point in the space, the focal length, the first rotation angle, the second rotation angle and the third rotation angle of the camera, calculating a projection reference point intermediate coordinates in a first intermediate coordinate system of the projection reference point.

20. The camera calibration system as claimed in claim 19, wherein the processing unit is further configured to perform:

an operation of calculating a second ratio of a fifth distance and a sixth distance based on a third reference coordinate element of the reference point, the third translation vector element of the translation vector, and a third projection reference point intermediate coordinate element of the projection reference point intermediate coordinates, and, an operation of calculating the first translation vector element and the second translation vector element of the translation vector based on a first reference coordinate element of the reference point, a second reference coordinate element of the reference point, a first projection reference point intermediate coordinate element of the projection reference point intermediate coordinates, a second projection reference point intermediate coordinate element of the projection reference point intermediate coordinates and the second ratio, wherein the fifth distance is the distance between the camera and the reference point, wherein the sixth distance is the distance between the camera and the projection reference point.

* * * * *